US012619611B1

(12) United States Patent
Gassner et al.

(10) Patent No.: US 12,619,611 B1
(45) Date of Patent: May 5, 2026

(54) SYSTEMS AND METHODS FOR GENERATING AND EXECUTING A QUERY ON A COLUMN-ORIENTED DATABASE

(71) Applicant: Veeva Systems Inc., Pleasanton, CA (US)

(72) Inventors: Peter Gassner, Pleasanton, CA (US); Tristram Arthur Liddiard, Innisfil (CA); Peter Alexander Murray, Toronto (CA); Colin Sham, Mississuaga (CA)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 18/961,705

(22) Filed: Nov. 27, 2024

Related U.S. Application Data

(60) Provisional application No. 63/572,425, filed on Apr. 1, 2024.

(51) Int. Cl.
| | |
|---|---|
| *G06F 16/24* | (2019.01) |
| *G06F 16/22* | (2019.01) |
| *G06F 16/242* | (2019.01) |
| *G06F 16/2455* | (2019.01) |

(52) U.S. Cl.
CPC ........ *G06F 16/2455* (2019.01); *G06F 16/221* (2019.01); *G06F 16/242* (2019.01)

(58) Field of Classification Search
CPC ... G06F 16/2455; G06F 16/221; G06F 16/242
USPC ........................................ 707/769
See application file for complete search history.

(56) References Cited

U.S. PATENT DOCUMENTS

| | | | | | |
|---|---|---|---|---|---|
| 6,434,554 | B1 * | 8/2002 | Asami | ............... | G06F 16/235 |
| | | | | | 707/999.005 |
| 8,027,970 | B1 * | 9/2011 | Brette | ............. | G06F 16/24549 |
| | | | | | 707/760 |
| 9,836,501 | B2 * | 12/2017 | Robichaud | ......... | G06F 16/2423 |
| 10,592,525 | B1 * | 3/2020 | Khante | ............... | G06F 16/258 |
| 10,671,641 | B1 * | 6/2020 | Holenstein | ........... | G06F 16/284 |
| 11,609,908 | B2 * | 3/2023 | Shaik | ................. | G06F 16/2282 |
| 11,651,012 | B1 * | 5/2023 | Dinga | ...................... | G06F 8/33 |
| | | | | | 717/107 |
| 12,282,478 | B2 * | 4/2025 | Schlosser | ............ | G06F 16/2425 |
| 12,417,214 | B1 * | 9/2025 | Zhang | ................ | G06F 40/205 |
| 2002/0123991 | A1 * | 9/2002 | Asami | ................... | G06F 16/235 |
| 2003/0220893 | A1 * | 11/2003 | Dettinger | .............. | G06F 16/24 |
| 2004/0254939 | A1 * | 12/2004 | Dettinger | ........... | G06F 16/2457 |
| 2008/0189289 | A1 * | 8/2008 | Dettinger | ............. | G06F 16/288 |

(Continued)

*Primary Examiner* — Hanh B Thai

(57) ABSTRACT

A method for generating and populating a digital file includes modifying case data to restructure the case data from a first data structure to a column-oriented data structure such that each case data record is maintained in the modified case data. The method further includes receiving a request identifying a query template and a digital file template and selecting the query template including a query from the first repository. The method further includes executing the query to select modified case data. The method further includes selecting the digital file template including at least one filter and a digital file layout from the second repository and filtering the selected portion of the modified case data. The method further includes generating the digital file based on the digital file layout of the digital file template and the filtered case data and outputting the digital file.

20 Claims, 21 Drawing Sheets

400

404 — Receive a Request for Case Data Including a Query Template

408 — Select the Query Template Including a Query and Metadata from a Query Repository 412 — Execute the Query of the Query Template on the Second Case Repository to Select Case Data 416 — Organize the Selected Case Data Based on the Metadata 420 — Receive a Request to Generate a Digital File Including a Digital File Template 424 — Select the Digital File Template from a Digital File Repository 428 — Generate a Digital File Based on the Digital File Template and the Organized Case Data 432 — Output the Digital File

(56)          References Cited

U.S. PATENT DOCUMENTS

| | | | |
|---|---|---|---|
| 2010/0017733 A1* | 1/2010 | Barros | G06F 3/0482 |
| | | | 715/810 |
| 2011/0264667 A1* | 10/2011 | Harizopoulos | G06F 16/221 |
| | | | 707/E17.085 |
| 2011/0314027 A1* | 12/2011 | Xu | G06F 16/2228 |
| | | | 707/E17.014 |
| 2012/0016901 A1* | 1/2012 | Agarwal | G06F 16/258 |
| | | | 707/769 |
| 2012/0215807 A1* | 8/2012 | Srivastava | G06F 16/41 |
| | | | 707/769 |
| 2013/0198168 A1* | 8/2013 | Huang | G06F 16/245 |
| | | | 707/769 |
| 2014/0082033 A1* | 3/2014 | Meriwether | G06F 16/182 |
| | | | 707/827 |
| 2015/0161291 A1* | 6/2015 | Gur | G06F 16/90332 |
| | | | 707/722 |
| 2015/0193504 A1* | 7/2015 | Naidu | G06F 16/24 |
| | | | 707/774 |
| 2016/0225271 A1* | 8/2016 | Robichaud | G06F 16/2423 |
| 2016/0335243 A1* | 11/2016 | Zhai | G06F 16/2228 |
| 2017/0083569 A1* | 3/2017 | Boguraev | G06F 40/205 |
| 2017/0315784 A1* | 11/2017 | Sarferaz | G06F 16/248 |
| 2017/0364557 A1* | 12/2017 | Yi | G06F 16/2219 |
| 2018/0121497 A1* | 5/2018 | Robichaud | G06F 3/04842 |
| 2019/0065538 A1* | 2/2019 | Leuchtenburg | G06F 16/258 |
| 2019/0286636 A1* | 9/2019 | Bedard | G06F 16/248 |
| 2019/0311051 A1* | 10/2019 | Legler | G06F 16/2453 |
| 2019/0325051 A1* | 10/2019 | George | G06F 16/211 |
| 2020/0026706 A1* | 1/2020 | Nir | G06F 16/211 |
| 2020/0050586 A1* | 2/2020 | Pal | G06F 16/148 |
| 2020/0050607 A1* | 2/2020 | Pal | G06F 16/2471 |
| 2020/0233905 A1* | 7/2020 | Williams | G06F 16/904 |
| 2020/0334245 A1* | 10/2020 | Plattner | G06F 16/27 |
| 2021/0109928 A1* | 4/2021 | Robichaud | G06T 11/206 |
| 2021/0141796 A1* | 5/2021 | Shah | G06F 16/22 |
| 2021/0157978 A1* | 5/2021 | Haramati | G06F 40/177 |
| 2021/0271676 A1* | 9/2021 | Horn | G06F 16/24556 |
| 2021/0342785 A1* | 11/2021 | Mann | G06F 16/258 |
| 2022/0051286 A1* | 2/2022 | Bharakhada | G06Q 30/0239 |
| 2022/0309286 A1* | 9/2022 | Freese | G06F 16/2443 |
| 2024/0169027 A1* | 5/2024 | Freese | G06F 18/40 |
| 2024/0232225 A1* | 7/2024 | Bedard | G06F 16/2465 |
| 2024/0378202 A1* | 11/2024 | Chen | G06F 16/2455 |
| 2024/0394251 A1* | 11/2024 | Brende | G06F 16/24522 |
| 2024/0394274 A1* | 11/2024 | Ajmani | G06F 16/254 |
| 2025/0036975 A1* | 1/2025 | Ren | G06N 3/04 |
| 2025/0063083 A1* | 2/2025 | Grinberg | G06Q 10/06393 |

* cited by examiner

200

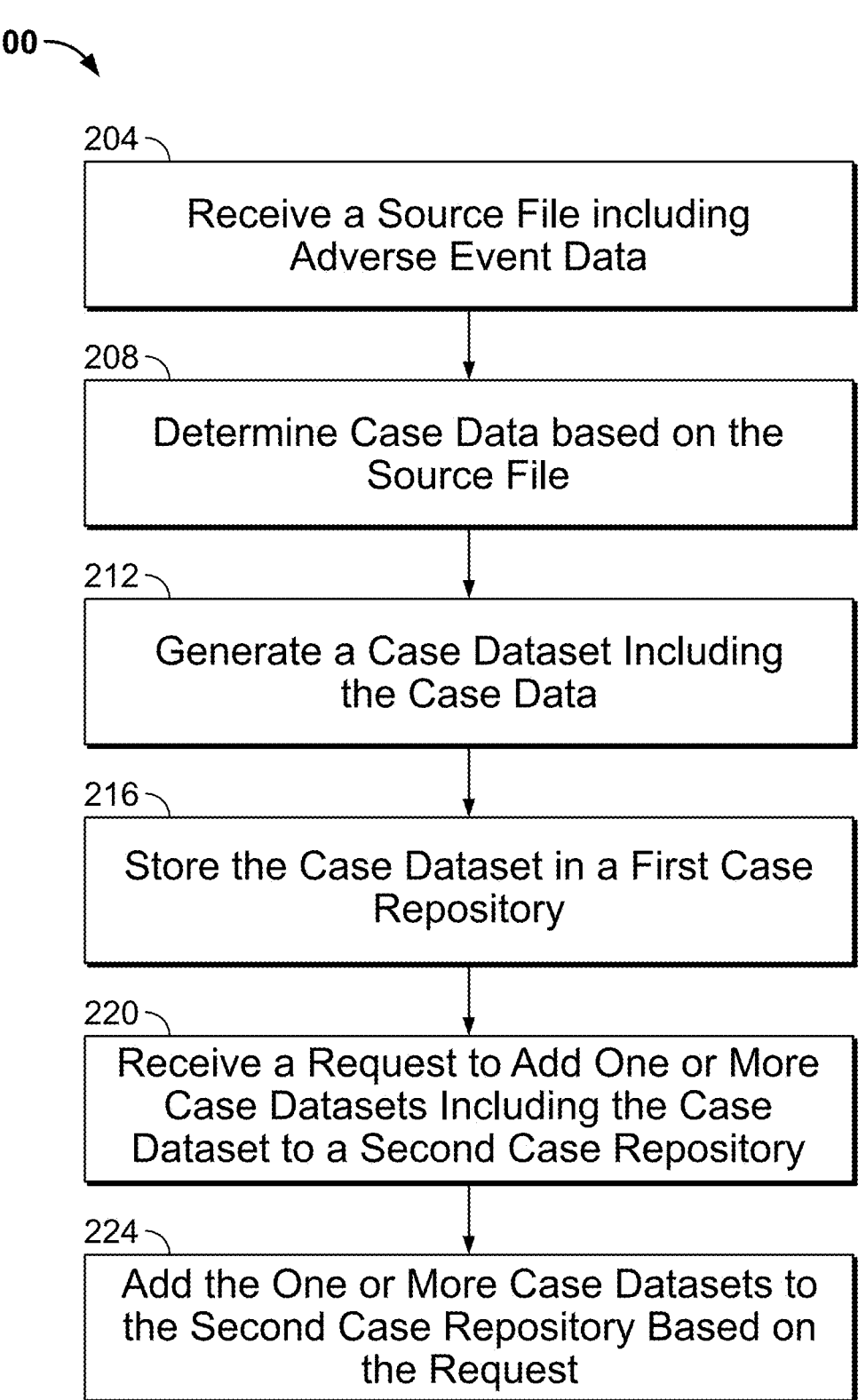

204

Receive a Source File including Adverse Event Data

208

Determine Case Data based on the Source File

212

Generate a Case Dataset Including the Case Data

216

Store the Case Dataset in a First Case Repository

220

Receive a Request to Add One or More Case Datasets Including the Case Dataset to a Second Case Repository

224

Add the One or More Case Datasets to the Second Case Repository Based on the Request

FIG. 2

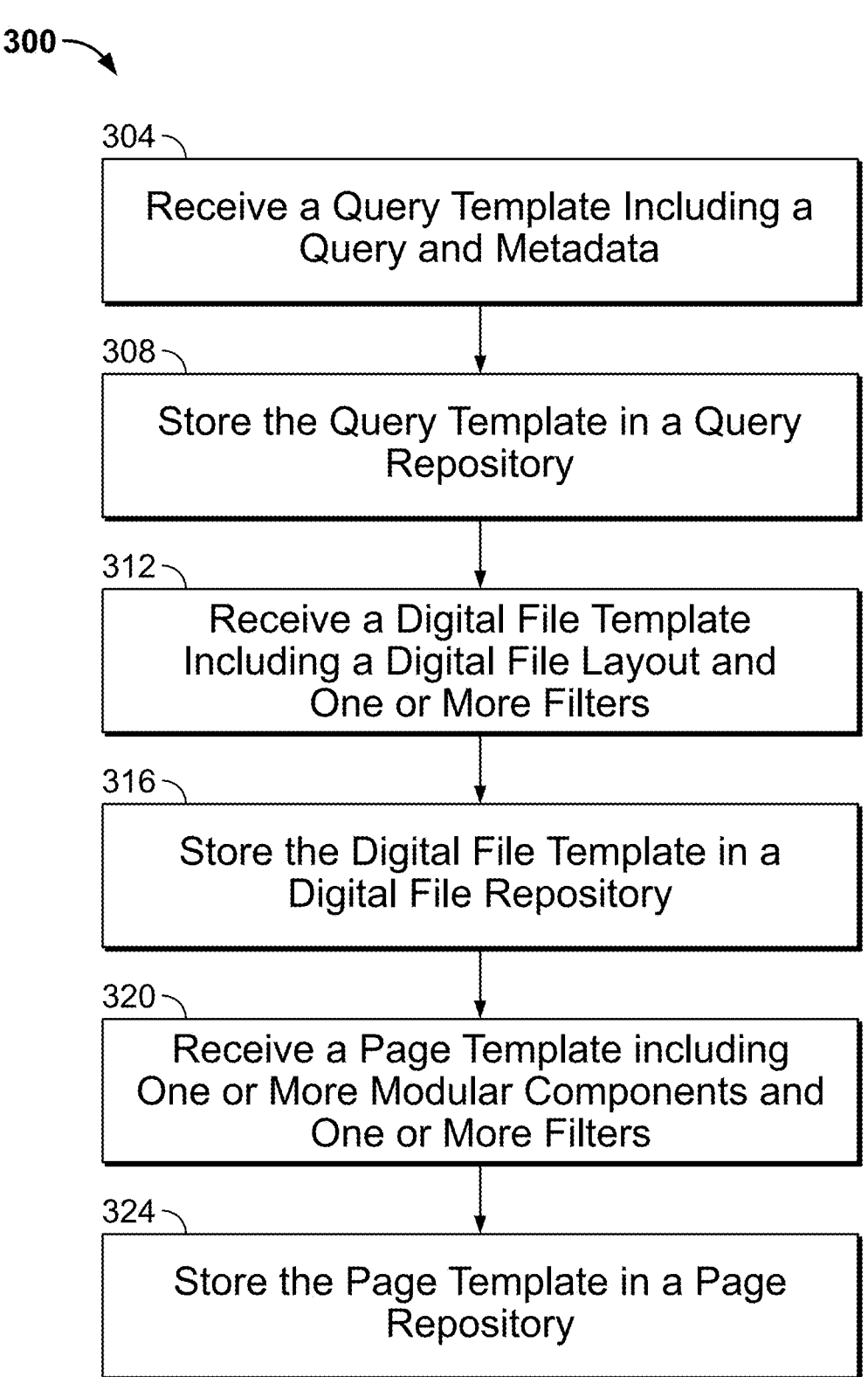

300

304

Receive a Query Template Including a Query and Metadata

308

Store the Query Template in a Query Repository

312

Receive a Digital File Template Including a Digital File Layout and One or More Filters

316

Store the Digital File Template in a Digital File Repository

320

Receive a Page Template including One or More Modular Components and One or More Filters

324

Store the Page Template in a Page Repository

FIG. 3

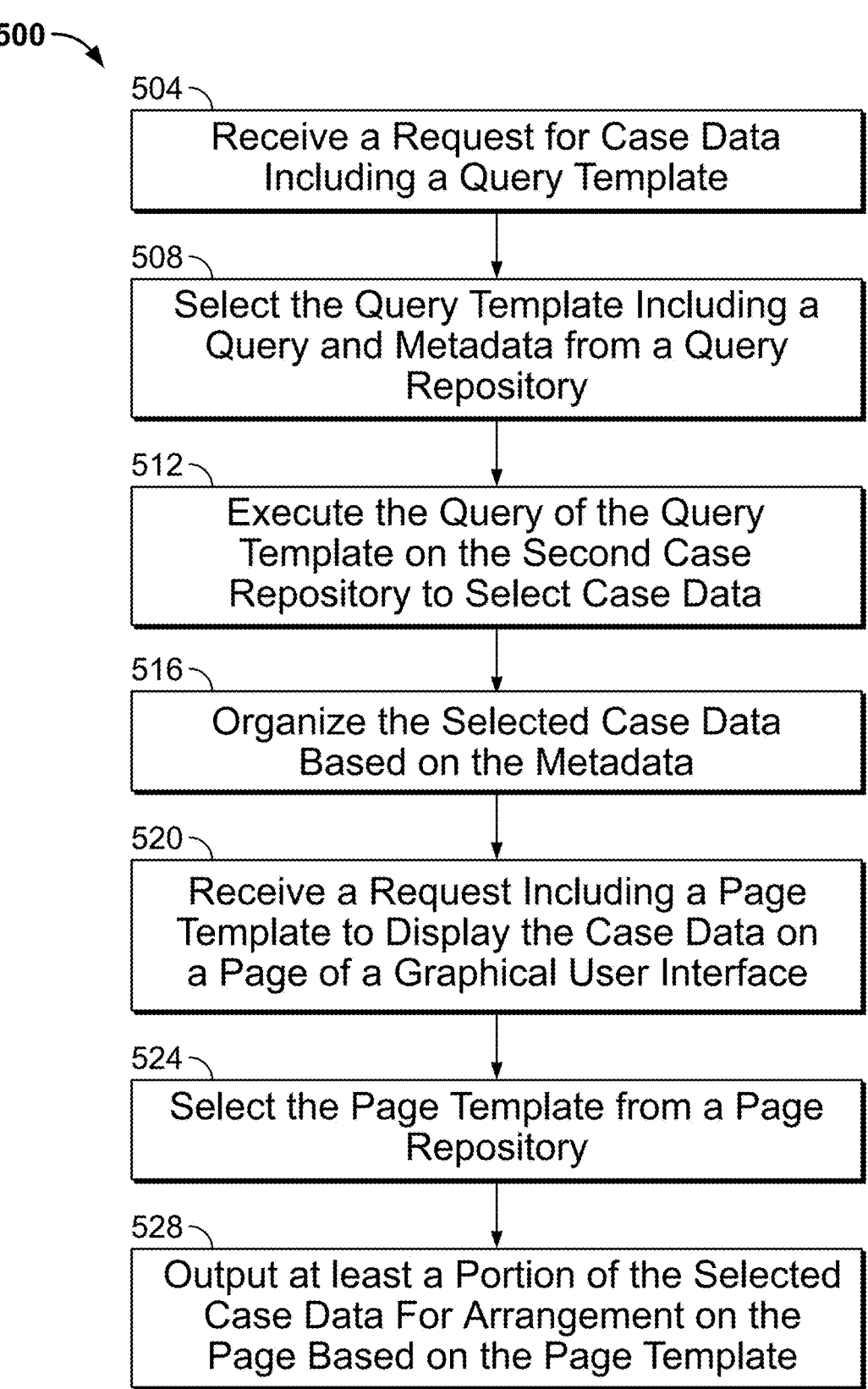

500

504 — Receive a Request for Case Data Including a Query Template

508 — Select the Query Template Including a Query and Metadata from a Query Repository 512 — Execute the Query of the Query Template on the Second Case Repository to Select Case Data 516 — Organize the Selected Case Data Based on the Metadata 520 — Receive a Request Including a Page Template to Display the Case Data on a Page of a Graphical User Interface 524 — Select the Page Template from a Page Repository 528 — Output at least a Portion of the Selected Case Data For Arrangement on the Page Based on the Page Template

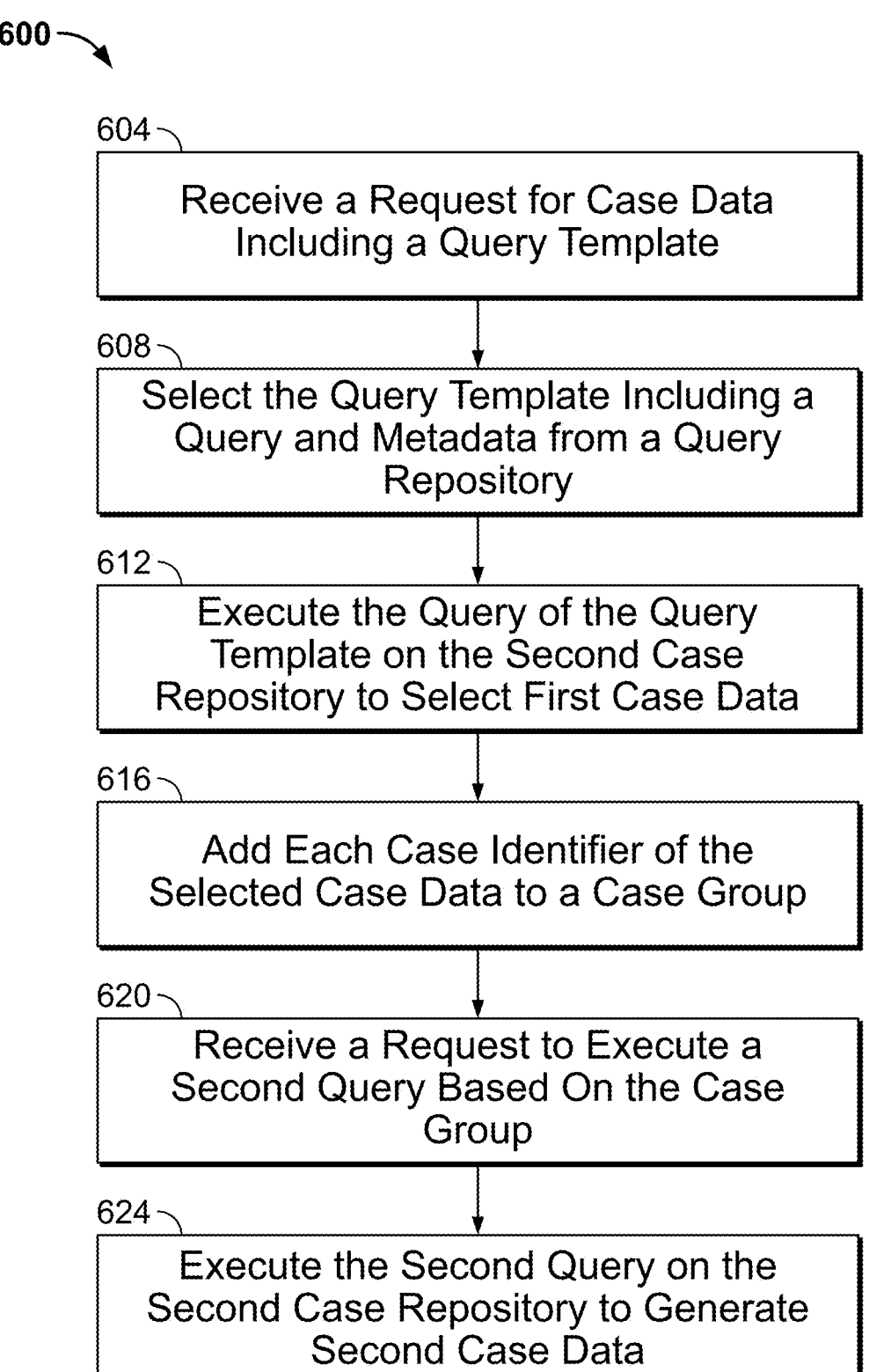

604

Receive a Request for Case Data Including a Query Template

608

Select the Query Template Including a Query and Metadata from a Query Repository

612

Execute the Query of the Query Template on the Second Case Repository to Select First Case Data

616

Add Each Case Identifier of the Selected Case Data to a Case Group

620

Receive a Request to Execute a Second Query Based On the Case Group

624

Execute the Second Query on the Second Case Repository to Generate Second Case Data

FIG. 6

| Event (SOC) | Event (PT) | Serious, Unlabeled | | Serious, Labeled | | Non Serious, Unlabeled | | Non Serious, Labeled | | | Grand Total |
| | | Domestic | Foreign | Domestic | Foreign | Domestic | Foreign | Domestic | Foreign | Subtotal | |
| $event-SOC | $event-PT | $Serious_unlabeled_domestic | $Serious_unlabeled_foreign | $Serious_labeled_domestic | $Serious_labeled_foreign | $Nonserious_unlabeled_domestic | $Nonserious_unlabeled_foreign | $Nonserious_labeled_domestic | $Nonserious_labeled_foreign | $Subtotal | $Total |

| Case ID | Country Gender Age | Suspect Drug | Adverse Reaction | Assessment | | |
|---|---|---|---|---|---|---|
| US-VB-000006 | United States of America Female Elderly | Cholecap | Vertigo | Cholecap ⇄ Vertigo | Investigator | Not applicable |
| | | | | | Sponsor | Possibility Related |
| | | | Petechiae | Cholecap ⇄ Petechiae | Investigator | Not applicable |
| | | | | | Sponsor | Possibility Related |
| | | | Glucoma | Spare dryg ⇄ Glucoma | Investigator | Possibility Related |
| | | | | | Sponsor | Possibility Related |
| | | Cholecap | Vertigo | Cholecap ⇄ Vertigo | Investigator | Not applicable |
| | | | | | Sponsor | Possibility Related |
| | | | Petechiae | Cholecap ⇄ Petechiae | Investigator | Not applicable |
| | | | | | Sponsor | Possibility Related |
| | | | Glucoma | Spare dryg ⇄ Glucoma | Investigator | Possibility Related |
| | | | | | Sponsor | Possibility Related |

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Tabulation by System Organ Class of All Adverse Experiences

| SOC Class (1) | Preferred Team (2) | Serious, Unlabeled (5) | | Serious, labeled (6) | | Non Serious Unlabeled (7) | | Non Serious Labeled (8) | | Subtotal (9) | | Total (10) |
|---|---|---|---|---|---|---|---|---|---|---|---|---|
| | | Domestic (3) | Foreign (4) | Domestic | Foreign | Domestic | Foreign | Domestic | Foreign | Domestic | Foreign | |
| Cardiac disorders | | 3 | 0 | 0 | 0 | 0 | 0 | 0 | 0 | 3 | 0 | 3 |
| | Cardiac arrest | 3 | 0 | 0 | 0 | 0 | 0 | 0 | 0 | 3 | 0 | 3 |
| Gastrointestinal disorders | | 0 | 0 | 1 | 0 | 0 | 0 | 0 | 0 | 1 | 0 | 1 |
| | Discoloured vomit | 0 | 0 | 1 | 0 | 0 | 0 | 0 | 0 | 1 | 0 | 1 |
| General disorders and administration site conditions | | 1 | 1 | 0 | 0 | 0 | 0 | 0 | 0 | 1 | 0 | 1 |
| | Gait inability | 1 | 1 | 0 | 0 | 0 | 0 | 0 | 0 | 1 | 0 | 1 |
| Infections and infestations | | 1 | 0 | 1 | 0 | 0 | 0 | 0 | 0 | 2 | 1 | 3 |
| | Hepatitis infectious mononucleosis | 1 | 0 | 1 | 0 | 0 | 0 | 0 | 0 | 2 | 1 | 3 |
| Investigations | | 1 | 0 | 1 | 0 | 1 | 0 | 0 | 0 | 3 | 0 | 3 |
| | 17 ketosteroids urine descreased | 0 | 0 | 0 | 0 | 1 | 0 | 0 | 0 | 1 | 0 | 1 |
| | Abdomen scan | 1 | 0 | 1 | 0 | 0 | 0 | 0 | 0 | 2 | 0 | 2 |
| | | | | | | | | | All Domestic | 20 | | |
| | | | | | | | | | All Foreign | 2 | | |
| | | | | | | | | | Grand Total (11) | 22 | | |

| Case Name | Country<br>Report Type | Country<br>Age<br>Gender | Product Name / Form / Daily Dose<br>[Dose Frequency] |
|---|---|---|---|
| ${latest_case_version_c.name_v} | ${latest_case_version_c.event_country_v}<br>${latest_case_version_c.report_type_v} | ${latest_case_version_c.event_country_v}<br>${latest_case_version_c.age_v}<br>${latest_case_version_c.gender_value_v} | ${latest_case_version_c.caseproduct}<br>${latest_case_version_c.casepdosage_d}<br>${latest_case_version_c.casepdosage_do}<br>${latest_case_version_c.casepdosage_fr} |
| Case Comments | ${latest_case_version_c.narrative_preview_v} | | |

| Study ID EUDRA CT Primary SOC | Case Number | Country | Product Name/ Formulation | Daily Dose | Dates of Treatment | Event Onset or Late |
|---|---|---|---|---|---|---|
| ID 123 EUDRA: CT abc SOC: A | 000018-CA-0001 | Canada 42 years Female | Product 1/ 1) Chewable tablet in filters 2) Chewable tablet in filters | 1) 25 mg, 4 times per day 2) 200 mg, every 1 day | 1) 27 -Sep 2022 - 04 Jan 2023 1) 01 Feb 2023 - 01 Feb 2023 | 01 Jan 2024 02 Jan 2024 |
| | | | Product 2 1) Capsule | 1) 25 mg, 4 times per day 2) 200 mg, every 1 day | 1) 27 -Sep 2022 - 04 Jan 2023 1) 01 Feb 2023 - 01 Feb 2023 | 01 Jan 2024 02 Jan 2024 |
| | Case Comments | | Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip deserunt mollit anim id est laborum. Lorem ipsum dolor sit amet, consectetur adipiscing elit, sed do eiusmod tempor incididunt ut labore et dolore magna aliqua. Ut enim ad minim veniam, quis nostrud exer proident, sunt in culpa qui officia deserunt mollit anim id est laborum. Lorem ipsum dolor sit amet, consectetur adipiscing elit, sed do eiusmod tempor incididunt ut labore et dolore magna aliqua. Ut enim ad Excepteur sint occaecat cupidatat non proident, sunt in culpa qui officia deserunt mollit anim id est laborum. Lorem ipsum dolor sit amet, consectetur adipiscing elit, sed do eiusmod tempor incididunt ut lab dolore eu fugiat nulla pariatur. Excepteur sint occaecat cupidatat non proident, sunt in culpa qui officia deserunt mollit anim id est laborum. | | | |

FIG. 15

SYSTEMS AND METHODS FOR GENERATING AND EXECUTING A QUERY ON A COLUMN-ORIENTED DATABASE

CROSS-REFERENCE TO RELATED APPLICATIONS

This application claims priority to U.S. Provisional Patent Application No. 63/572,425, filed Apr. 1, 2024, which is incorporated herein by reference in its entirety.

TECHNICAL FIELD

The present disclosure relates to systems and methods for generating and executing a query on a column-oriented database.

BACKGROUND

Researchers, scientists, industry players, academics, government regulators, and other stakeholders are increasingly in need of efficient and simple ways to generate and execute queries on column-oriented repositories (e.g., databases) to perform data analytics.

SUMMARY

One embodiment relates to a method for generating and populating a digital file in a case processing and analysis system. The case dataset transmission system includes a provider computing system. The case processing and analysis system includes a provider computing system. The provider computing system includes a column-oriented repository for storing modified case data, a first repository for storing query templates, a second repository for storing digital file templates, and a third repository for storing multiple case data records including case data. The method includes receiving a first request to add the case data of the multiple case data records of the third repository to the column-oriented repository. The method further includes modifying the case data to restructure the case data from a first data structure to a column-oriented data structure. The case data is restructured such that each case data record of the plurality of case data records is maintained in the modified case data. The method further includes storing the modified case data in the column-oriented repository. The method further includes receiving a second request identifying a query template and a digital file template and selecting the query template including a query from the first repository. The method further includes executing the query of the query template on the column-oriented repository to select a portion of the modified case data stored in the column-oriented repository. The method further includes selecting the digital file template including at least one filter and a digital file layout from the second repository and filtering the selected portion of the modified case data based on the at least one filter of the digital file template to generate filtered case data. The method further includes generating the digital file based on the digital file layout of the digital file template and the filtered case data and outputting the digital file.

Another embodiment relates to a method for generating and a page of a graphical user interface in a case processing and analysis system. The case dataset transmission system includes a provider computing system. The case processing and analysis system includes a provider computing system. The provider computing system includes a column-oriented repository for storing modified case data, a first repository for storing query templates, a second repository for storing digital file templates, and a third repository for storing multiple case data records including case data. The method includes receiving a first request to add the case data of the multiple case data records of the third repository to the column-oriented repository. The method further includes modifying the case data to restructure the case data from a first data structure to a column-oriented data structure. The case data is restructured such that each case data record of the plurality of case data records is maintained in the modified case data. The method further includes storing the modified case data in the column-oriented repository. The method further includes receiving a second request identifying a query template and a page template and selecting the query template including a query from the first repository. The method further includes executing the query of the query template on the column-oriented repository to select a portion of the modified case data stored in the column-oriented repository. The method further includes the page template including a first modular component associated with a first filter and a second modular component associated with a second filter. The method further includes the selected portion of the modified case data based on the first filter of the first modular component to generate first filtered case data and the selected portion of the modified case data based on the second filter of the second modular component to generate second filtered case data. The method further includes outputting the first filtered case data and the second filtered case data to a client computing device to enable display on a user interface based on the page template. The user interface includes the page comprising a data viewer section including at least one of: the first modular component or the second modular component.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 2 may be a flow diagram of a method for generating a case dataset and copying the case dataset from a first repository to a second repository, according to an example embodiment.

FIG. 3 may be a flow diagram of a method for receiving and storing a query template and a digital file template, according to an example embodiment.

FIG. 5 may be a flow diagram of a method for generating and executing a query on a column-oriented repository, according to an example embodiment.

FIG. 6 may be a flow diagram of a method for generating a case series and executing a query on a column-oriented repository based on the case series, according to an example embodiment.

FIG. 11 may be an illustration of some aspects of a first layout file utilized by the case processing and analysis system of FIG. 1, according to an example embodiment.

FIG. 12 may be an illustration of some aspects of a first digital file generated by the case processing and analysis system of FIG. 1, according to an example embodiment.

FIG. 13 may be an illustration of some aspects of a second digital file generated by the case processing and analysis system of FIG. 1, according to an example embodiment.

FIG. 14 may be an illustration of some aspects of a second layout file utilized by the case processing and analysis system of FIG. 1, according to an example embodiment.

FIG. 15 may be an illustration of some aspects of a third digital file generated by the case processing and analysis system of FIG. 1, according to an example embodiment.

DETAILED DESCRIPTION

Figure 1:
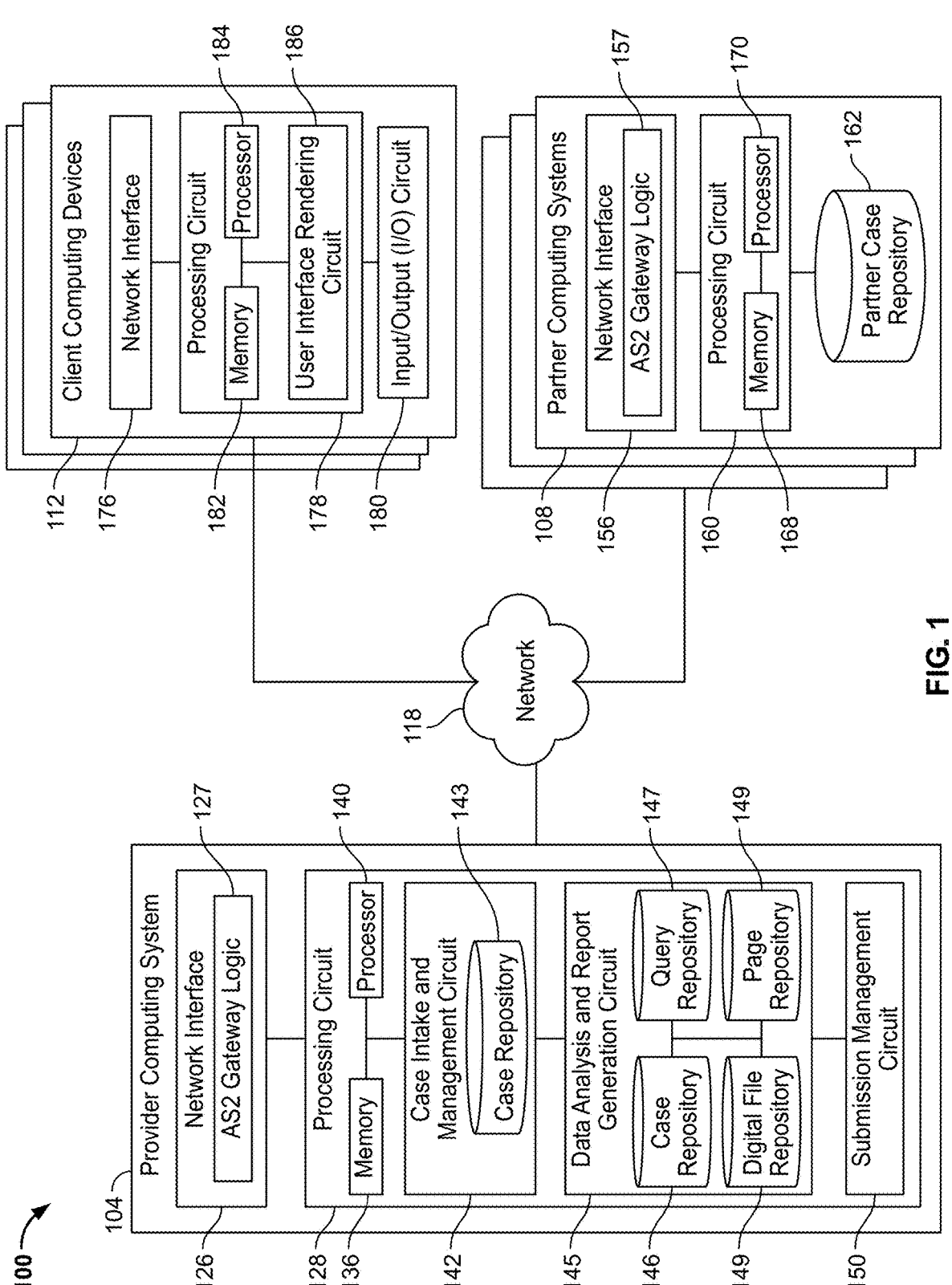
FIG. 1 may be a component diagram of a case processing and analysis system, according to an example embodiment.

Referring generally to the figures, systems and methods for generating and executing a query on a column-oriented database are disclosed. The systems and methods described herein provide for improved generation and execution of queries on case data, and thereby help and improve the pharmacovigilance industry by more accurately, quickly, and efficiently providing for analytics of case data. For example, copying case data of case datasets, which is stored in a relational manner, to a column-oriented repository and then generating and executing queries on the column-oriented repository, the present systems provide for improved query performance, improved data compression, and enhanced scalability which is suited for analytics. For instance, because the present systems and methods receive a request for case data, generate a query, and then execute the query on a column-oriented repository, the present systems and methods can achieve higher compression ratios because a column-oriented repository stores similar data types together. This is because data within a column often has similar characteristics, like all being numbers or dates, allowing for more efficient compression techniques. Likewise, column-oriented repositories are specifically designed for analytical queries that involve filtering, aggregation (e.g., calculating sums or averages) and working with large datasets. They excel at these tasks due to their ability to quickly access and process relevant data. As a result, the present systems and methods utilize less processing power to execute the query and execute the query in a much faster and more efficient manner.

Additionally, by utilizing a query template which receives a query in a structured query language (SQL) and metadata in an adjacent section which is then used to populate the query in SQL, the present systems and methods provide for improved query generation and customizability. For instance, typical case data analytical systems may provide a user interface which handles the translation of the query to SQL thereby only allowing for certain query operations. In comparison, the present systems and methods utilize a query template and query template page including a query section. Then, via the query section, the query may be structured specifically using SQL, thereby providing for greater precision and control and performance optimization when generating the query. For instance, because the query may be structured specifically using SQL, the present systems and methods provide for control over the query's logic and structure. For instance, via SQL the query may specify complex joins, filters, and aggregations with more nuance than what an interface might offer. This allows the query to be tailored to extract exactly the needed case data. Further, by utilizing SQL to represent the query (as compared to a user interface), the present systems and methods provide for optimized performance through indexing strategies, choosing efficient join types, and/or crafting queries to minimize data retrieval, which requires less memory and processing power than an interface-translated query.

Additionally, the systems and methods described herein provide an improvement to query implementations and systems by executing a query to generate and/or select case data and then generating a case series by adding each case identifier of the selected case data to the case series. For instance, when executing a query, the present systems and methods may select case data and then generate a case series to mark the cases representing the first case data by adding each case identifier to a case group or case series. The case series may be a placeholder that represents the case data of the first query in a smaller data format than the case data itself. For instance, the case data may include multiple fields and/or portions (e.g., case name, case adverse event(s), case medical product(s), case reporter(s), case identifier(s), etc.), whereas the case series may only include a listing of the case identifiers. In this way, the case series can be used by the provider computing system 104 to select a subset of the first case data without having to store and manage the entire set of case data itself, thereby saving on memory and processing power to retrieve and extract the data. For instance, typical query systems may execute nested queries by saving the resulting set of data as a whole. Then, executing the second query on the resulting set of data. In comparison, the present systems and methods provide for compressed data storage and require less memory overall by generating a case series including a case identifier for each case selected in the first query. Then, to execute the second query, the present systems and methods may select the case data of the case datasets identified by the case series and then execute the second query on the resulting case data.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products (and associated medical product data) or substances that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact data, a case identifier or case version identifier (e.g., case worldwide ID (WWID), case number, case number plus case version, etc.), case priority data, case seriousness data, case documents, medical product data (e.g., substances in the medical product, medical product registrations, medical product dosages, medical product name, etc.) patient data, and other data associated with a case as defined by the standard ISO/HL7 27953 as well as any past or future standards governing ICSRs of the ISO, the WHO, the FDA, the EMA, or other national health agencies governing ICSRs.

As used herein, the term "substance" can include a substance as defined by the FDA or the EMA. Further, the term "substance" can include an active ingredient or any component of a medical product that provides pharmacological activity or other direct effect in the diagnosis, cure, mitigation, treatment, or prevention of disease, or to affect the structure or any function of the body of man or animals. In this regard, the "substance" may be component responsible for the activity of a medical product.

Referring now to FIG. 1, a system 100 for generating and executing a query on a column-oriented repository is shown, according to an example embodiment. The system 100 includes a provider computing system 104, multiple partner computing systems 108, and multiple client computing devices 112 connected by a secure network (e.g., a network 118).

The network 118 communicably and operably couples the provider computing system 104, the partner computing devices 108, and the client computing devices 112 such that communicable and operable computing may be provided between the provider computing system 104, the partner computing devices 108, and the client computing devices 112 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In one example, the provider computing system 104 may include multiple server computing devices. In some embodiments, the provider computing system 104 may act as a host and provide an application (e.g., a web-based application, a mobile application, etc.) to the client computing devices 112 over the network 118 in response to authenticating the respective computing device. For example, the provider computing system 104 may receive authentication data (e.g., a username and corresponding password, a limited-use key, a two-factor authentication code or key, etc.) from one of the client computing devices 112. The provider computing system 104 may then authenticate the client computing device 112 based on the authentication data and provide an application to the client computing device 112 over the network 118. In some examples, the provider computing system 104 may be a multi-tenant system where various elements of hardware and software may be shared by one or more customers. In a multi-tenant system, a user is typically associated with a particular customer. In one example, a user (e.g., of the client computing device 112) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126 and a processing circuit 128. In some embodiments, the provider computing system 104 may include an input/output circuit (e.g., similar to (e.g., the same as) an input/output circuit 180 as will described further herein).

The network interface 126 is structured to establish connections with the partner computing devices 108 and the client computing devices 112 by way of the network 118. The network interface 126 includes program logic (e.g., AS2 Gateway Logic 127) and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The AS2 gateway logic 127 includes programmable instructions that facilitate communication (transmission and receipt) using the Applicability Statement 2 (AS2) communication protocol (as specified in Request for Comment (RFC) 4130) over the network 118 via the network interface circuit 126. For example, using the AS2 gateway logic 127, the network interface 126 may transmit or receive files (e.g., the source file, a case, etc.) or other data to the partner computing systems 108 or client computing devices 112 using the AS2 Gateway protocol. In other embodiments, the AS2 gateway logic 127 may transmit or receives files using the most updated Applicability Statement communication protocol (e.g., AS3, etc.).

The processing circuit 128, as shown, comprises a memory 136, a processor 140, a case intake and management circuit 142, data analysis and report generation circuit 145, and a submission management circuit 150. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 140 to control the processing circuit 128. The memory 136 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the case intake and management circuit 142 is structured or configured to receive, generate, store, and manage case datasets. For instance, the case intake and management circuit 142 may be configured or structured to periodically receive or retrieve a source file including adverse event data associated with an adverse event from a trusted source (e.g., one of the partner case repositories 162). In some embodiments, the case intake and management circuit 142 may then match the adverse event data with medical product data of a medical product repository (not shown), generate a case dataset including case data, and store the case dataset within the case repository 143 of the case intake and management circuit 142). In one example, the case intake and management circuit 142 may be an instance of Vault Safety®. In some embodiments, the provider computing system 104 may include multiple case intake and management circuits 140 (e.g., one for each customer, one for each user, etc.). In some embodiments, when generating the case dataset, the case intake and management circuit 142 may further search the case repository 143 for case datasets which may be a duplicate of the newly generated case. In other embodiments, the case intake and management circuit 142 may output (via the network interface circuit 126) one or more of the case datasets as a specific file type (e.g., E2B (R3) XML file, as a Council for International Organizations of Medical Sciences (CIOMS) II PDF file, etc.) to one or more of the partner computing systems 108 or the client computing devices 112. In other embodiments, the submission management circuit 150 outputs the case datasets and/or the digital documents described herein.

The case repository 143 may be repository (e.g., a database) that is structured or configured to receive, store, and manage case datasets and their respective data (e.g., case data, adverse event data, etc.). For example, the case repository 143 may receive case datasets and related case objects and store the case datasets therein. Then, in response to receiving a query or a request for one or more case datasets (e.g., a query for all cases that include a specific substance), the case repository 143 may provide and/or return the case datasets stored therein that match the query or request. For example, the case repository 143 may receive a query from the case intake and management circuit 142 for all cases that include a specific criteria (e.g., a specific medical product, a specific country of origin, a specific date range). In response, the case repository 143 may determine each case dataset that includes the specific criteria stored therein and return each case dataset. Further, the case repository 143 can be structured according to various database types, such as relational, hierarchical, network, flat, point-in time, and/or object relational. In some embodiments, the case repository 143 includes a plurality of nonvolatile/non-transitory storage media such as solid-state storage media, hard disk storage media, virtual storage media, cloud-based storage drives, storage servers, and/or the like. In some embodiments, the case repository 143 may be a part of or included in the processing circuit 128 (as compared to the case intake and management circuit 143).

As described herein, the data analysis and report generation circuit 145 is structured or configured to perform analytics (e.g., matching, summation, aggregation, statistical value generation, etc.) on case data and generate a digital file based on the case data. For instance, the data analysis and report generation circuit 145 may copy case datasets from the case repository 143 to a case repository 145, which is configured for high-performance data analysis. The data analysis and report generation circuit 145 may then receive a query and execute the query on the case repository 145 to select and/or organize case data. The data analysis and report generation circuit 145 may then receive a digital file layout, which defines a digital file and how the organized case data is to be organized or arranged in the digital file. The data analysis and report generation circuit 145 may then generate a digital file and store the digital file in a digital file repository 148. In one example, the case intake and management circuit 142 may be an instance of Vault Safety Workbench®. As shown, the data analysis and report generation circuit 145 includes the case repository 146, a query repository 147, the digital file repository 148, and a page repository 149.

The case repository 146 may be similar to the case repository 143 and may be repository (e.g., a database) that is structured or configured to receive, store, and manage case datasets and their respective data (e.g., case data, adverse event data, etc.). For example, the case repository 146 may receive case datasets and related case objects and store the case data of the case datasets therein. Then, in response to receiving a query or a request for case data (e.g., a query for all cases that include a specific substance), the case repository 146 may provide and/or return the case data stored therein that match the query or request. However, in comparison to the case repository 143, the case repository 146 may be structured and/or configured for high-volume data analytics. For instance, the case repository 146 may be structured as a column-oriented database or repository, in which all the values for a specific column are stored together. For instance, the case repository 146 may be an Amazon Redshift® repository, a Microsoft Azure Synapse Analytics® repository, a Google Bigquery® repository, and the like. In other embodiments, the case repository 146 may be structured as a NoSQL repository, a key-value repository, a wide-column repository, and a Hadoop or Spark repository. In some embodiments, the case repository 146 includes a plurality of nonvolatile/non-transitory storage media such as solid-state storage media, hard disk storage media, virtual storage media, cloud-based storage drives, storage servers, and/or the like. In some embodiments, the case repository 146 may be a part of or included in the processing circuit 128.

In general, typical databases or repositories, also known as row-oriented database management systems (DBMS), store data like tables where each row represents a record (individual data point or piece of data), and each column represents a specific attribute of that data. In a simple example, the storage may be similar to a spreadsheet where each row is a customer, and each column is details like name, address, or purchase history. A column-oriented DBMS flips this storage approach. Instead of storing all the data for a single record together in a row, it stores all the values for a specific column together. In this example, you would have all the customer names in one column, all the addresses in another, and so on. Column-oriented databases store each column as a separate data structure, often compressed, as most columns contain similar data types. This reduces storage space and memory requirements when compared to row-oriented databases. Likewise, when the column-oriented DBMS is queried, it only needs to access the relevant columns instead of reading entire rows, thereby requiring less processing power and providing for improved query efficiency. This is particularly efficient when you are only interested in a specific set of data points, making queries for analytics much faster.

In some embodiments, the second case repository 146 may store selected case data as a case series, which may be a set or listing of case identifiers (e.g., case version identifiers) selected in a query. For instance, the data analysis and report generation circuit 145 may execute a query on the case repository 146 and determine selected case data. Accordingly, instead of keeping a record of all of the case data, the provider computing system 104 may generate a case series including a case version identifier for each selected case dataset. Then, the case series may be stored in the second case repository 146 for use in another query or digital file. In some embodiments, the query repository 147 may store the case series therein. In some embodiments, the data analysis and report generation circuit 145 may include a case series repository (not shown) in which the case series are stored.

The query repository 147 may be repository (e.g., a database) that is structured or configured to receive, store, and manage query templates. For example, the query repository 147 may receive one or more query templates and related queries and metadata (e.g., a case data identifier) and store the query templates therein. Then, in response to receiving a request to query case data identifying the query template, the query repository 147 may provide and/or return the identified query template including the query and the metadata of the query template. The query templates may each be a reusable template that represents a query and organization, by metadata (e.g., case data identifier), of the case data. For instance, a query template may represent a query for all case datasets that have a seriousness of "Serious-results in hospitalization" and a specific medical product (e.g., drug x), as well as the organization of the case datasets by date. Each query may include query language (e.g., SQL) representing the query and including one or more clauses including a case data identifier (e.g., "controlled_vocabulary.id," "e2b_code_v", etc.) as shown in FIGS. 5A-5C. In this regard, the query repository 147 may store the query templates therein. Further, the query repository 147 can be structured according to various database types, such as, relational, hierarchical, network, flat, point-in time, and/or object relational. In some embodiments, the query repository

147 includes a plurality of nonvolatile/non-transitory storage media such as solid-state storage media, hard disk storage media, virtual storage media, cloud-based storage drives, storage servers, and/or the like. In some embodiments, the query repository 147 may be a part of or included in the processing circuit 128.

Likewise, the digital file repository 148 may be repository (e.g., a database) that is structured or configured to receive, store, and manage digital file templates and/or digital files. For example, the digital file repository 148 may receive one or more digital file templates and related digital file layouts and filter preferences and store the digital file templates therein. Then, in response to receiving a request to generate a digital file identifying the digital file template, the digital file repository 148 may provide and/or return the identified digital file template including the digital file layout and the filter preferences of the digital file template. Further, the digital file repository 148 can be structured according to various database types, such as, relational, hierarchical, network, flat, point-in time, and/or object relational. In some embodiments, the digital file repository 148 includes a plurality of nonvolatile/non-transitory storage media such as solid-state storage media, hard disk storage media, virtual storage media, cloud-based storage drives, storage servers, and/or the like. In some embodiments, the digital file repository 148 may be a part of or included in the processing circuit 128.

Similarly, the page repository 149 may be repository (e.g., a database) that is structured or configured to receive, store, and manage a page (e.g., a graphical user interface page, a web page, etc.) and the layout of the web page. For example, the page repository 149 may receive a layout for a web page including one or more tabs, one or more modules of each tab, and one or more data sources of the modules. In one example, the page repository 149 may receive a layout for a dashboard page 1000 including three tabs (e.g., "main," "demographics," and "adverse events"). Each tab may include multiple modules and an arrangement of the modules. Likewise, each module may include a pointer to a data source (e.g., case data) which is used to populate and generate the module, as will be described herein. Accordingly, the page repository 149 can be structured according to various database types, such as, relational, hierarchical, network, flat, point-in time, and/or object relational. In some embodiments, the page repository 149 includes a plurality of nonvolatile/non-transitory storage media such as solid-state storage media, hard disk storage media, virtual storage media, cloud-based storage drives, storage servers, and/or the like. In some embodiments, the page repository 149 may be a part of or included in the processing circuit 128.

The submission management circuit 150 is structured or configured to output or provide the generated case dataset to the one of the partner computing systems 108, in response to generating the case dataset. For instance, using the example above, the submission management circuit 150 may generate an electronic submission associated with the generated case dataset and output the case dataset (e.g., as an E2B (R2 or R3) XML file, as a CIOMS II PDF file, as an email, etc.) to the partner computing system 108 associated with the FDA (e.g., the FDA submissions gateway), in response to the case originating in the USA. In some embodiments, the submission management circuit 150 may output the case dataset using the AS2 communication protocol to the partner computing system 108. In other embodiments, other communication protocols (e.g., file transfer protocol (FTP), email, etc.) may be used to output or transmit the case dataset to the partner computing system 108.

In some embodiments, the provider computing system 104 (e.g., the case intake and management circuit 142, the processing circuit 128, etc.) may further include a medical product repository (not shown) which may be repository (e.g., a database) that is structured or configured to receive, store, and manage medical products and medical product data of users or customers. In this regard, the medical product repository may receive, store, and manage medical products including medical product registrations. For example, a customer may have a medical product registered with the FDA (e.g., after applying for and receiving approval) and the EMA. The medical product registration with the FDA may include a medical product name, a list of substance(s) or active ingredient(s), a dosage or strength, a route of administration, a marketing status, and/or a national drug code (NDC) identifier. The medical product registration with the EMA may include the same but have a different identifier. Accordingly, one of the client computing devices 112 may provide medical product data including each piece of the FDA medical product registration and the EMA medical product registration to the provider computing system 104 for storage in the medical product repository. Accordingly, the medical product repository may receive the medical product data and store the medical product data in association with two specific medical products (e.g., one for the FDA and the USA and one for the EMA and the specific country(s) in Europe). In that regard, each medical product stored in the medical product repository may represent a single medical product registration. In this way, a single substance or group of substances may be represented by multiple medical products in the medical product repository (e.g., a first medical product associated with a first medical product registration for the EMA, a second medical product associated with a second medical product registration for the FDA, a third medical product associated with a third medical product registration for Health Canada, and so on).

While not shown, in some embodiments, the provider computing system 104 may include a separate repository for each data type described herein. For instance, the provider computing system 104 may include the first case repository 143, the second case repository 146 (also referred to as the analytical case repository 146), the query repository 147, the digital file repository 148, a reporter repository (not shown), a health code repository (not shown), a partner repository (for storing electronic addresses, communication protocols, and the like associated with partner computing systems 108) (not shown), a medical product verification preferences repository (not shown), a study repository (not shown), and the like.

Still referring to FIG. 1, the partner computing systems 108 may be managed by third-party partners (e.g., the FDA, the EHA, Health Canada, partner company 1, partner company 2, partner computing system xyz, etc.) and can be or include a computing device or system configured to communicate with the provider computing system 104 over the network 118. For instance, the partner computing systems 108 can each be a server computer system, a gateway computing system, a laptop computer a desktop computer, and any other network-connected device that can communicate over the network 118. For example, one of the partner computing systems 108 may be the Electronics Submission Gateway (ESG) of the FDA through which one or more E2B XML files may be received from and/or provided to. In another example, one of the partner computing systems 108 may be a laptop computer operated by an employee of a partner company.

In operation, the partner computing systems 108 may communicate with the provider computing system 104 or the client computing device 112 to send and/or receive one or more electronic communications (e.g., case datasets, source files, etc.). For instance, a customer (e.g., pharma company 123) may submit case datasets to the FDA over the ESG of the FDA. Accordingly, the provider computing system 104 may provide case datasets to the first partner computing system associated with the FDA. For instance, the provider computing system 104 (and more specifically the submission management circuit 148) may generate an outbound transmission including one or more case datasets. Then, the provider computing system 104 may output the outbound transmission to the first partner computing system 108.

As shown, each partner computing system 108 includes a network interface 156, a processing circuit 160, and a partner case repository 162. In some embodiments, each partner computing system 108 further includes a key repository (not shown) for storing AS2 keys and certificates.

The network interface 156 is structured to establish connections with the provider computing system 104 and/or the client computing device 112 by way of the network 118. The network interface 156 includes program logic (e.g., AS2 Gateway logic 157) and/or hardware-based components that connect each partner computing system 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The AS2 gateway logic 157 includes programmable instructions that facilitate communication (transmission and receipt) using the Applicability Statement 2 (AS2) communication protocol (as specified in Request for Comment (RFC) 4130) over the network 118 via the network interface circuit 156. For example, using the AS2 gateway logic 157, the network interface 156 may transmit or receive files (e.g., the source file, a case, etc.) or other data to the provider computing system 104 or client computing devices 112 using the AS2 Gateway protocol. In other embodiments, the AS2 gateway logic 127 may transmit or receives files using the most updated Applicability Statement communication protocol (e.g., AS3, etc.).

The processing circuit 160, as shown, comprises a memory 168 and processor 170. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FP- GAs), a digital signal processor (DSP), a group of processing components or other suitable electronic processing components.

The partner case repository 162 may be similar or the same as the case repository 143 and is a repository (e.g., a database, cloud storage, etc.) that is structured or configured to receive, store, and manage case datasets associated with adverse events. For example, one of the partner computing systems 108 may receive a case dataset from the provider computing system 104 and store case dataset in the partner case repository 162. Further, the partner case repository 162 can be structured according to various database types, such as relational, hierarchical, network, flat, point-in time, and/ or object relational. In some embodiments, the partner case repository 162 includes a plurality of nonvolatile/non-transitory storage media such as solid-state storage media, hard disk storage media, virtual storage media, cloud-based storage drives, storage servers, and/or the like.

Still referring to FIG. 1, the client computing devices 112 can each be any type of computing device or computing system. For instance, each client computing device 112 can be one or more of a mobile phone, a tablet computer, a laptop computer, a smart watch, a server computer system, or any other internet-connected device. In operation, the client computing devices 112 may communicate and interface with the provider computing system 104 via the network 118 to query templates including queries as well as digital file templates including digital file layouts, as will be described further herein. As shown, each client computing device 112 may include a network interface 176, a processing circuit 178, and the input/output (I/O) circuit 180.

The network interface 176 is structured to establish connections with the provider computing system 104 by way of the network 118. The network interface 176 includes program logic and/or hardware-based components that connect the client computing device 112 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 178, as shown, comprises a memory 182, a processor 184, and a user interface generation or rendering circuit 186. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 178. The memory 182 may be or include tangible, non-transient volatile memory and/or non-volatile memory. The processor 184 may be implemented as a general-purpose processor, an application specific integrated circuit (ASIC), one or more field programmable gate array (FPGAs), a digital signal processor (DSP), a group of processing components or other suitable electronic processing components.

The user interface rendering circuit 186 may be configured to receive a user interface (e.g., a web interface in an HTML file and related files, a downloaded graphical user interface, etc.) from the provider computing system 104 and render the user interface on the client computing device 112 via the I/O circuit 180. In this way, the provider computing system 104 may generate one or more user interfaces and provide the one or more user interfaces to the user interface rendering circuit 186 to be rendered on the client computing device 112 (e.g., on a display of the I/O circuit 180 of the client computing device 186).

The I/O circuit 180 is structured to receive communications from and provide communications to the user of the client computing device 112 (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input/output devices described herein.

Referring now to FIG. 2, a method 200 of generating a case dataset and copying the case dataset from a first repository to a second repository is shown, according to an example embodiment. Method 200 can be carried out by the system of FIG. 1. More particularly, the method 200 can be carried out by the processing circuit 128 of the provider computing system 104 and through communication with the partner computing systems 108 and the client computing devices 112.

Method 200 commences at step 204 at which the provider computing system 104 receives a source file including adverse event data. The source file and the adverse event data may be associated with one or more adverse events. For instance, the source file may include adverse event information for each adverse event. Further, the source file may be received from one of the client computing devices 112 or one of the partner computing systems 108. In some embodiments, the source file may be an E2B (R2 or R3) XML file received via an AS2 Gateway communication from the one of the partner computing systems 108 or the client computing devices 112. In other embodiments, the source file may be received from one of the partner computing systems 108 via an application programming interface (API) of the provider computing system 104. In other embodiments, the source file may be at least one of a PDF file, an Excel file, a CSV file, an email, or other file types described herein. The adverse event data may identify or include medical product or substance data (e.g., a substance name, a medical product slang name or term, a medical product trade name, a NDC, a medical product identifier, a dosage, a country of origin, a strength, a lot number, a route of administration, etc.), study data (e.g., a study identifier), an adverse event term and code (e.g., a MedDRA term and code), reporter data (e.g., a reporter name, a reporter country, a reporter address or contact information (e.g., email, phone number, IP address, FTP address, etc.)), patient data (e.g., patient initials, patient address or contact information), a report type (e.g., spontaneous, from study, from marketed medical product, etc.), a seriousness of the adverse event, and the like.

Once the provider computing system 104 has received the source file, the method 200 proceeds to step 208 at which the provider computing system 104 determines or generates case data based on the source file. In some embodiments, the provider computing system 104 may determine the case data based at least partially on the adverse event data. For instance, the provider computing system 104 may transform or add each piece of adverse event data to a specific field or portion of the case data. In one example, an adverse event term of the adverse event data may be added to an adverse event field of the case data. In this regard, the case data may include at least a portion of the adverse event data of the source file. In another example, the provider computing system 104 may determine at least a portion of the case data by transforming adverse event data that is in an incorrect format into a correct format (e.g., "SE" to "Sweden"). In some embodiments, at step 308, the provider computing system 104 may further generate a priority of the case based on the adverse event data, a rank of the adverse events associated with the current case, a rank of the medical products, and the like.

Additionally, to determine case data at step 208, the provider computing system 104 may retrieve the medical product and/or study data of the medical product and/or study identified in the source file from a medical product repository (not shown) or study repository (not shown) and determine case data by matching the adverse event data with the medical product and/or study data. For example, the adverse event data of the source file may indicate that the patient consumed Y Milliliters of a medical product X on Mar. 23, 2000. The provider computing system 104 may then search the medical product repository (not shown) for medical product data pertaining to medical product X and return additional values and medical product data (e.g., dosage of medical product X, the chemical formula of medical product X, expected side effects of medical product X, a clinical study that medical product X is currently being studied in, a clinical study #, pertaining to medical product X, and the like) as previously provided by the user. This additional medical product data and study data may then be included in the case data. In another example, the adverse event information may indicate that the patient consumed medical products A, B, and C on Mar. 23, 2000. The provider computing system 104 may determine that the user has not provided any medical product data pertaining to medical products A and B but has provided medical product data pertaining to medical product C. Accordingly, the provider computing system 104 may retrieve the medical product data pertaining to medical product C as well as assign a ranking of one to the medical product C, while assigning a ranking of two or more to the medical products A and B. The ranking may then be used to list or sort the medical product data within the case dataset (i.e., a ranking of one appears higher than a ranking of two, and so on) and on any user interfaces.

Once the provider computing system 104 has determined the case data based on the source file, the method 200 proceeds to step 212 at which the provider computing system 104 generates a case dataset including the case data. In some embodiments, at step 212, the provider computing system 104 may generate a case data object (also referred to as a data record) associated with or including the case identifier of the case. In this regard, the case dataset may include a case data object which may be used as a vehicle or apparatus for the case dataset and storing the case data within the case repository 143 of the provider computing system 104. For instance, the provider computing system 104 may determine or generate the case data and then populate the case data object with the case data.

In some embodiments, before steps 208 or 212, the provider computing system 104 may search the case repository 134 for potential duplicate case datasets of the case dataset to be generated. For instance, the provider computing system 104 may search the case repository 134 for cases that include a similar or the same case identifier, medical product(s), adverse event(s), report date, reporter name, and the like. In response to returning one or more potential duplicate case datasets, the provider computing system 104 may provide the potential duplicate case datasets and the adverse event data of the source file (or the newly generated case data) for review and comparison. Then, in response to receiving an indication the case datasets are not duplicates and/or determining the potential duplicate case datasets are not a duplicate of the case dataset to be generated, the provider computing system 104 may proceed to step 208 or 212.

Once the provider computing system has generated the case dataset, the method 200 proceeds to step 216 at which the provider computing system 104 stores the case dataset (e.g., as a case data object) in the first case repository 143. For instance, the provider computing system 104 may add or provide the case dataset to the case repository 143 for storage therein.

In some embodiments, after step 216, the method 200 may end. In other embodiments, after the provider computing system 104 has stored the case dataset in the first case repository 143, the method 200 may proceed to step 220 at which the provider computing system 104 receives a request to add or copy the case data of one or more case datasets, including the case data of the generated and stored case dataset, of the first case repository 143 to the second case repository 146. In some embodiments, the request may be received from one of the client computing devices 112. In some embodiments, the request may identify specific criteria of the one or more case datasets (e.g., owned by a specific customer, include a specific medical product (e.g., drug x), associated with a specific study, between a first date and a second date, etc.), as compared to the specific individual case datasets.

Once the provider computing system 104 has received the request to add the case data of the one or more case datasets to the second case repository 146, the method 200 proceeds to step 224 at which the provider computing system 104 copies or adds the case data of the one or more case datasets to the second case repository 146. In some embodiments, in response to the request including specific criteria, the provider computing system 104 may select or retrieve the case datasets which match the specific criteria of the request. For instance, in response to the request identifying a specific customer, a specific medical product, and a specific time-frame (e.g., between date 1 and date 2), the provider computing system 104 may select or query the case datasets which match the criteria of the request. In some embodiments, to add the case data of the case datasets to the second case repository 146, the provider computing system 104 may reorganize or restructure the case data of the case datasets. For instance, the first case repository 143 may be organized as a relational repository, whereas the second case repository 146 may be organized as a column-oriented repository. Accordingly, the provider computing system 104 may restructure the case data of the case datasets from a relational data structure to a column-oriented data structure. In this regard, the provider computing system 104 may modify the case data from a relational structure to a column structure that includes a plurality of columns identified by a column header or case data identifier (e.g., case metadata). Each column may include a plurality of values of case data (e.g., case version identifier, medical product trade name, study name, etc.) and be associated with a specific case data identifier. In some embodiments, the second case repository 146 may receive the copies of the case datasets and restructure the case datasets while still maintaining the case datasets. In some embodiments, the case data may be modified or restructured such that the case datasets are maintained and identifiable within the modified case data and that filtering, querying, and the like may take place to select specific case datasets. In one example, the first case repository 143 may include 1.5 million case datasets. Accordingly, the case data for all 1.5 million case datasets may be added to the second case repository 146, and the 1.5 million case datasets may be maintained in the second case repository 146 such that the provider computing system 104 may query, filter, and perform data operations to select a specific portion of the 1.5 million case datasets (e.g., select all case datasets which include medical product x, filter the resulting case datasets for study y, etc.).

Referring now to FIG. 3, a method 300 of receiving and storing a query template and a digital file template is shown, according to an example embodiment. While different overall, it should be understood that any steps or discussion of the method 300 may be applied or included within the method 200, the method 400, the method 500, the method 600, and vice versa, and that such combinations are included within the scope of the present disclosure. For example, the method 200 may include any of the steps 304-316, steps 404-432, steps 504-528, or steps 604-624, after or before any steps included in the method 200, and the method 300 may include any of the steps 204-224, steps 404-432, steps 504-528, or steps 604-624, after or before any of the steps included in the method 300. Further, the method 400 may include any of the steps 204-224, steps 304-316, steps 504-528, or steps 604-624, after or before any steps included in the method 400. Likewise, the method 500 may include any of the steps 204-224, steps 304-316, steps 404-432, or steps 604-624, after or before any steps included in the method 500. Likewise, the method 600 may include any of the steps 204-224, steps 304-316, steps 404-432, or steps 504-528, after or before any steps included in the method 600. In a specific example, the provider computing system 104 may perform the method 300, then perform the method 200, and then perform the method 400. Method 300 can be carried out by the system of FIG. 1. More particularly, the method 300 can be carried out by the processing circuit 128 of the provider computing system 104 and through communication with the partner computing systems 108 and the client computing devices 112.

Method 300 commences at step 304 at which the provider computing system 104 receives a query template. In some embodiments, the query template may be received from one of the client computing devices 112. In some embodiments, the query template may be received from a client computing device 112, in response to the client computing device 112 providing admin-level credentials (e.g., an admin username and matching password, an admin username and 2-factor authentication, etc.). The query template may include a query (e.g., a query language (e.g., structured query language (SQL)) representing a query) and metadata (e.g., case data identifiers). For instance, the query template may include a query language (e.g., SQL) which represents the query and how the query is to be executed to select and/or generate case data. For instance, the query may include SQL including one or more clauses and case data identifiers (also referred to as metadata or case metadata), which are used to select, filter, and organize specific portions (e.g., columns, rows, tables, etc.) of the case data. Further, the metadata may identify or include the outputs of the query and how the outputs are to be organized (e.g., portions of the case data with a specific name is to be put in column A, portions of the case data with a second specific name is to be put in column B, and so on). In some embodiments, the query template may include one or more filters or filter preferences to be applied to the case data, as will be described further herein.

Once the provider computing system 104 has received the query template, the method 300 may proceed to step 308 at which the query template is stored in the query repository 147.

Figure 9A:
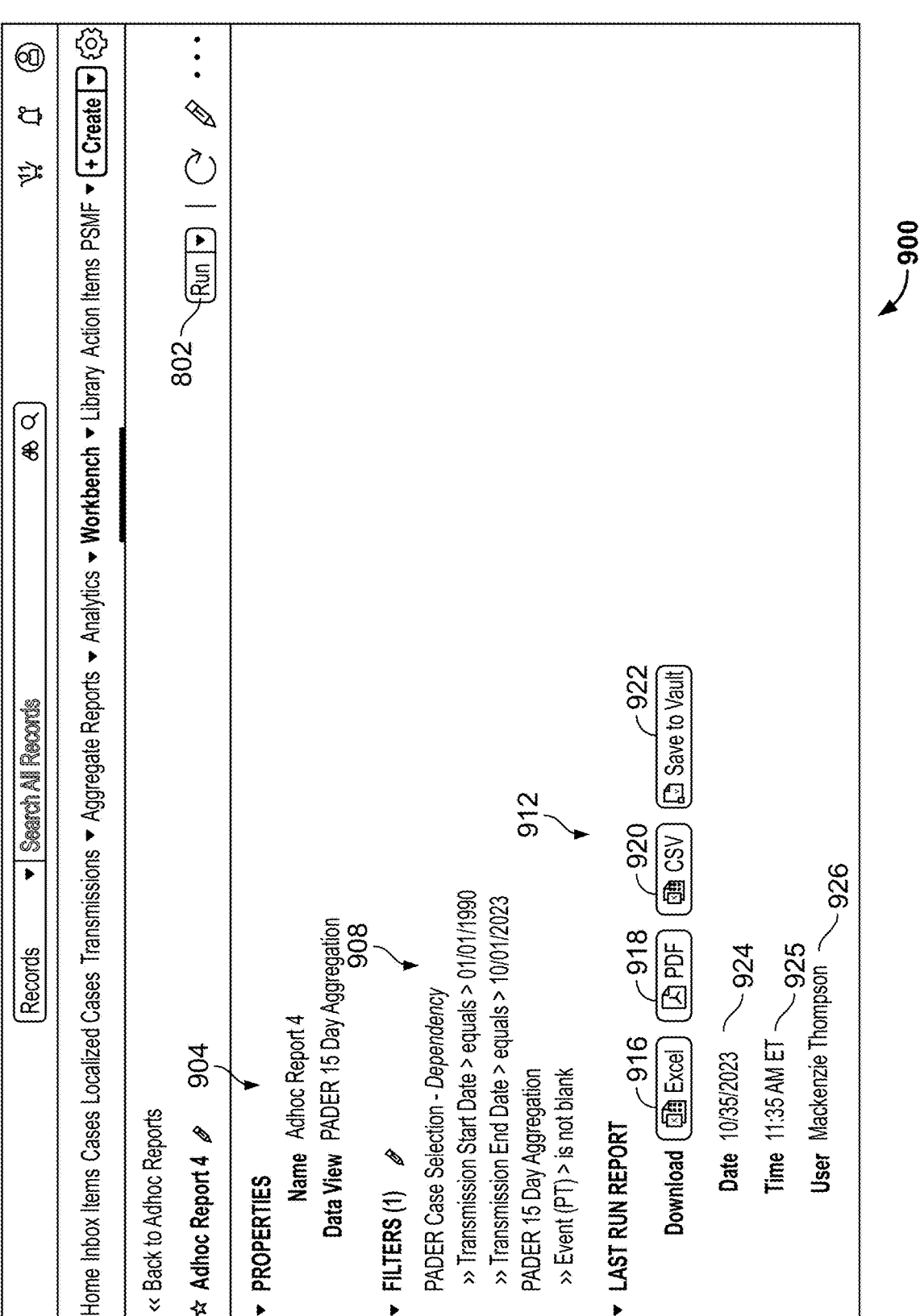
FIGS. 9A-9B may be illustrations of some aspects of a user interface generated by the case processing and analysis system of FIG. 1 to submit a query for execution and generation of a digital file, according to an example embodiment.
Figure 9B:
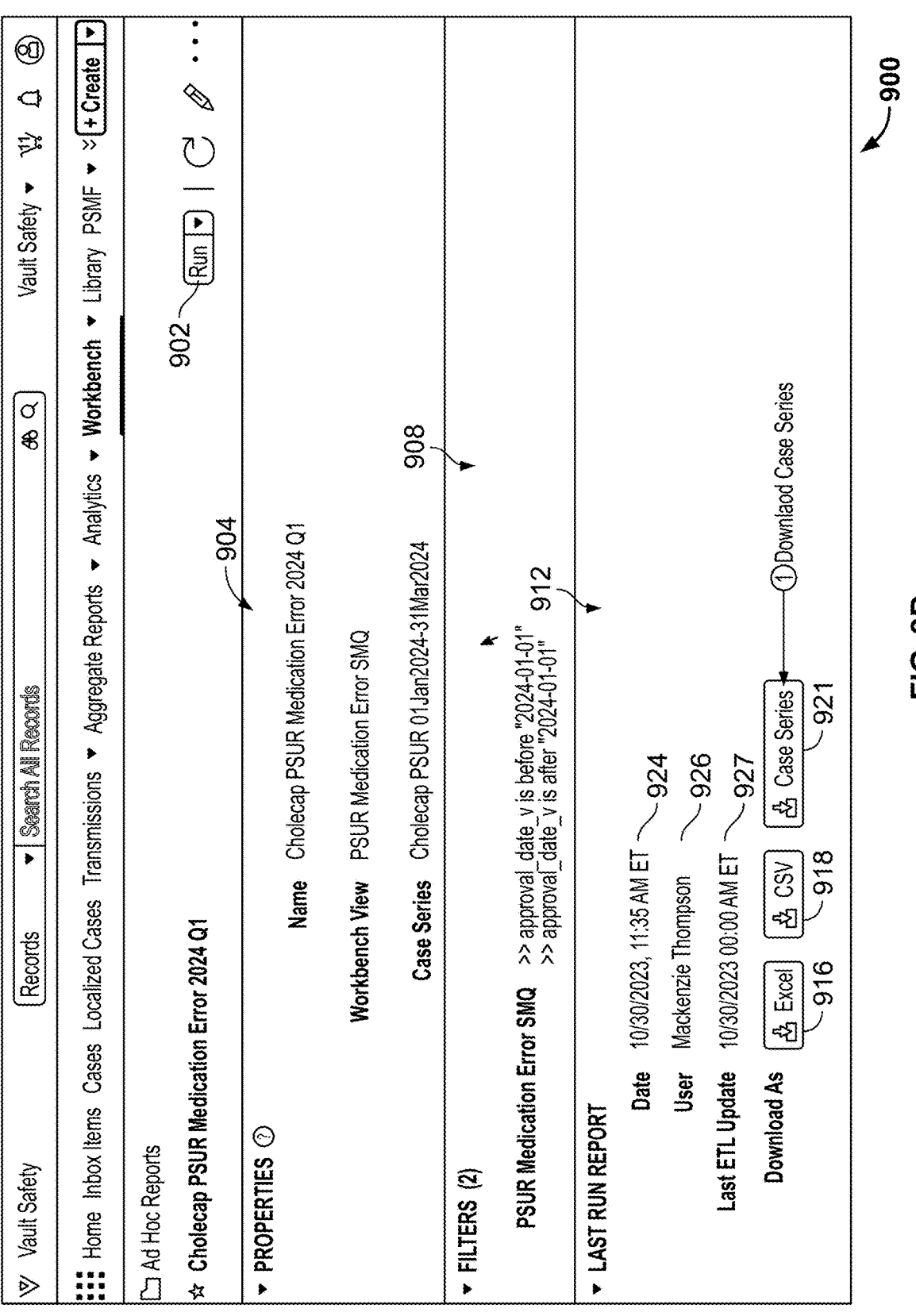

In some embodiments, the method 300 ends after step 308. In other embodiments, once the provider computing system 104 has stored the query template in the query repository 147, the method 300 proceeds to step 312, at which the provider computing system 104 receives a digital file template. In some embodiments, the digital file template may be received from one of the client computing devices 112. In some embodiments, the digital file template may be received from a client computing device 112, in response to the client computing device 112 providing admin-level credentials (e.g., an admin username and matching password, an admin username and 2-factor authentication, etc.). The digital file template may include a digital file layout and one or more filters or filter preferences. In some embodiments, the digital file template may include a layout file, as will be described further herein. The digital file layout may define the layout or organization of the digital file based on the returned case data of the query. For instance, the digital file layout may specify the specific columns, rows, data groupings, and the like. FIGS. 9A-9C show an example digital file layout. Likewise, the filters or filter preferences may define specific filters which are to be applied to the case data before it is added and arranged in the digital file. For example, the filter preferences may include a specific date range, a specific seriousness, a specific adverse event, a specific medical product, and one or more logical operators (e.g., $>$, $<$, $>=$, $<=$, $!=$, $==$, etc.), as will be described further herein.

Once the provider computing system 104 has received the digital file template, the method 300 may proceed to step 316 at which the digital file template is stored in the digital file repository 148.

Figure 10A:
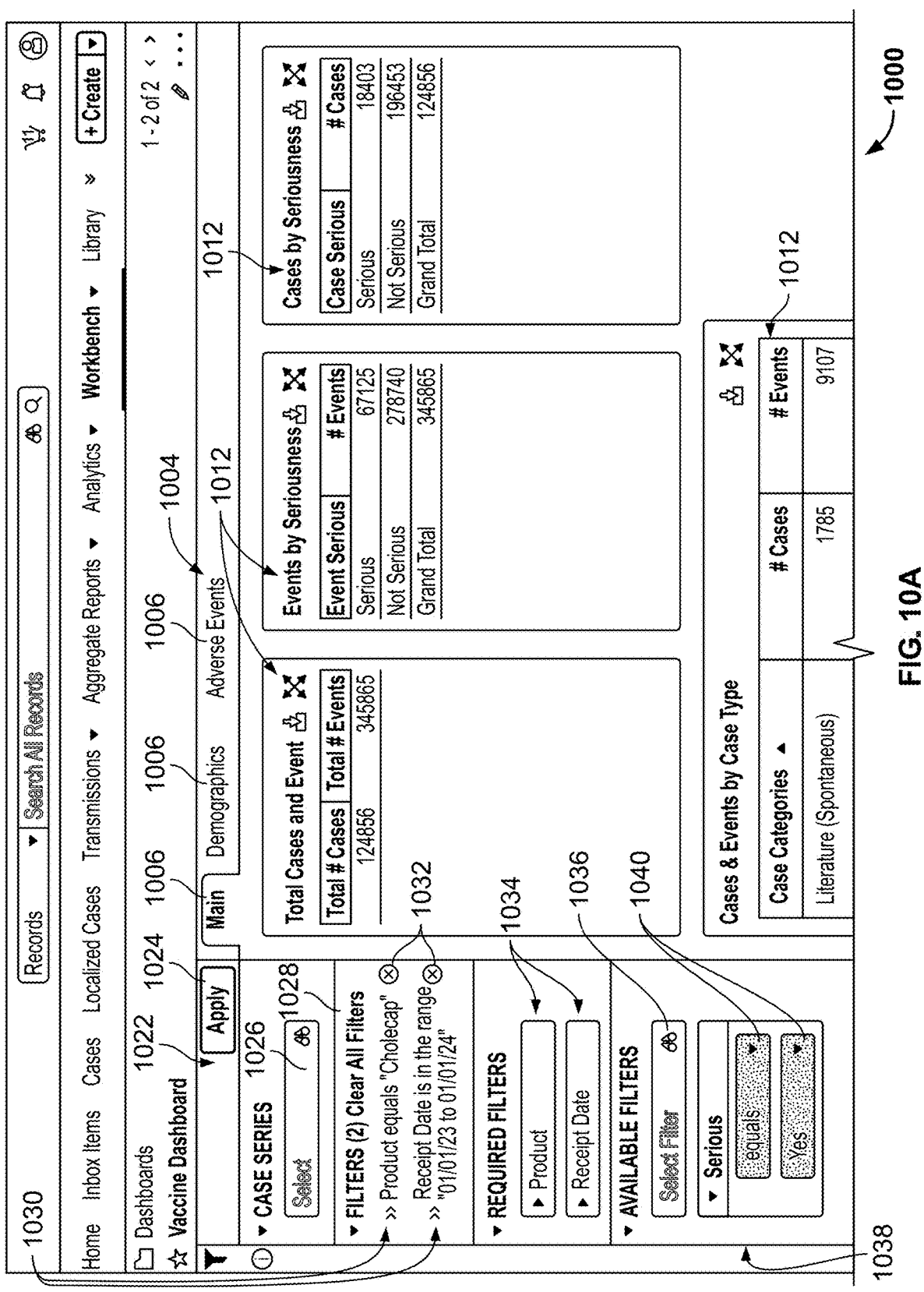
FIGS. 10A-10B may be illustrations of some aspects of a user interface generated by the case processing and analysis system of FIG. 1 to display and arrange queried case data, according to an example embodiment.

In some embodiments, after step 316, the method 300 may end. In other embodiments, once the provider computing system 104 has stored the digital file template in the digital file repository 148, the method 300 proceeds to step 320 at which the provider computing system 104 receives a page template. In some embodiments, the page template may be received from one of the client computing devices 112. In some embodiments, the page template may be received from a client computing device 112, in response to the client computing device 112 providing admin-level credentials (e.g., an admin username and matching password, an admin username and 2-factor authentication, etc.). The page template may define the layout of the dashboard page 1000 and include a query source, one or more tabs, one or more modules or modular components for each tab, and one or more data sources including optional filters. The modular components may include a component type (e.g., table, line chart, pie chart, etc.) and the data sources (including optional filters) to populate the modular component. For instance, a modular component may include the chart type of table and the data source of total case count and total event count from the source query. In this regard, the modular component may be a table with a total case count and a total event count (as shown in FIG. 10A).

Once the provider computing system 104 has received the page template, the method 300 proceeds to step 324 at which the provider computing system 104 stores the page template in the page repository 149.

Figure 4:
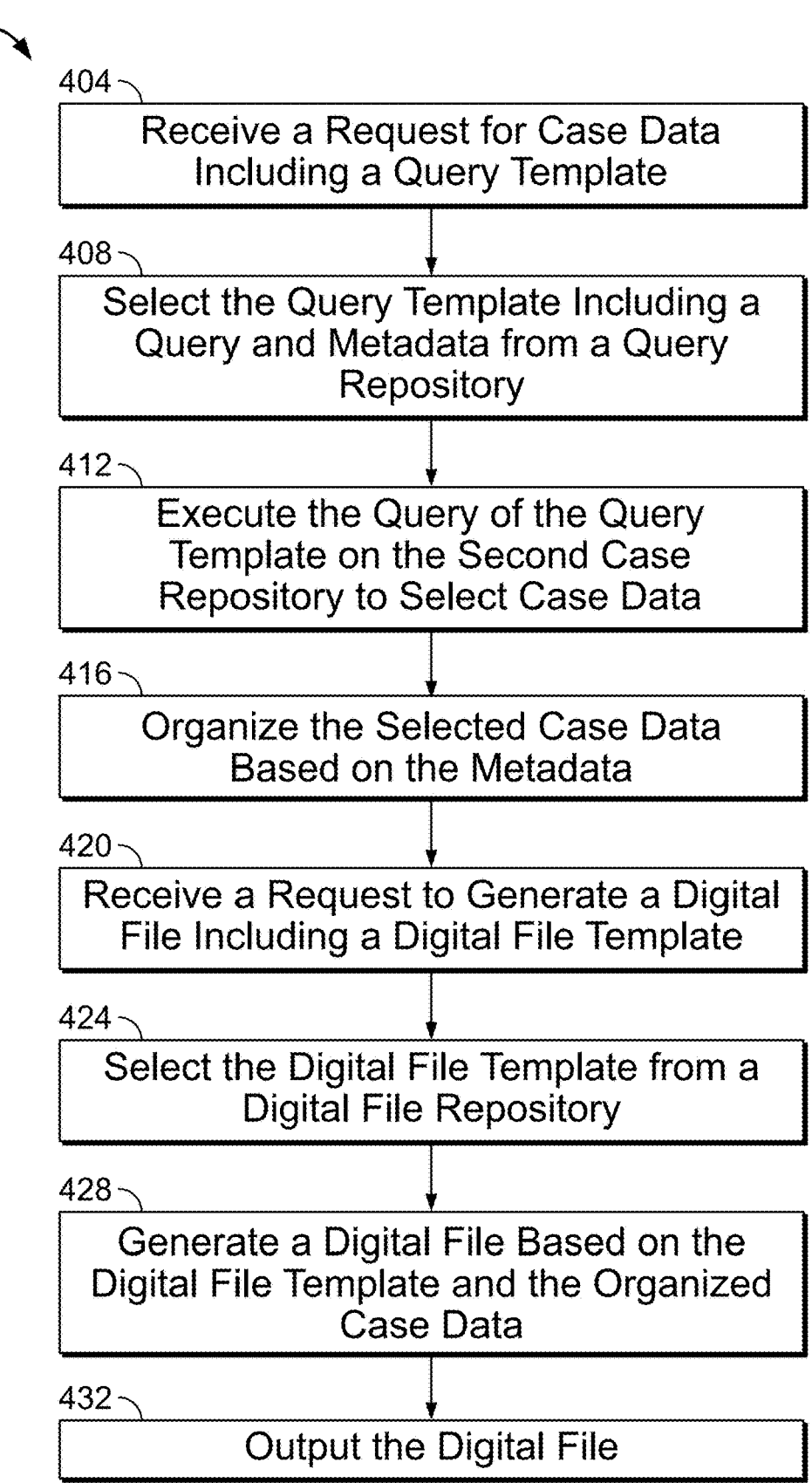
FIG. 4 may be a flow diagram of a method for generating and executing a query on a column-oriented repository, according to an example embodiment.

Referring now to FIG. 4, a method 400 of generating and executing a query on a column-oriented repository is shown, according to an example embodiment. Method 400 can be carried out by the system of FIG. 1. More particularly, the method 400 can be carried out by the processing circuit 128 of the provider computing system 104 and through communication with the partner computing systems 108 and the client computing devices 112.

Method 400 commences at step 404 at which the provider computing system 104 receives a request for case data. In some embodiments, the request may identify or include a query template of the query repository 147. In some embodiments, the request may be received from one of the client computing devices 112. In some embodiments, the request may identify one or more changes or additions to the query template. For instance, the request may identify the query template and one or more (additional) filter preferences, one or more (additional) pieces of metadata, one or more secondary queries to be performed, and the like. In other embodiments, the request may include a query (e.g., SQL representing the query) and/or metadata which defines how the selected case data is to be organized. In this regard, because the request includes the query to be executed, the provider computing system 104 may skip step 408 and proceed to step 412 where the query is executed.

Once the provider computing system 104 has received the request, the method 400 proceeds to step 408 at which the provider computing system 104 selects or retrieves the query template from the query repository 147. As described herein, the query template may include a query (e.g., SQL representing a query), one or more pieces of metadata (e.g., case data identifiers, and one or more filter preferences.

Once the provider computing system 104 has selected the query template from the query repository 147, the method 400 may proceed to step 412 at which the provider computing system 104 executes the query of the query template on the second case repository 146 to select case data. For instance, the provider computing system 104 may validate the SQL of the query and provide the SQL to the second case repository 146. The second case repository 146 may receive the SQL and execute the SQL on the stored case datasets to select specific case data identified by the SQL. For instance, the SQL may include a "SELECT" clause identifying multiple case data identifiers (e.g., "controlled_vocabulary.id," "e2b_code_v," etc.). In response, the second case repository 146 may retrieve the case data identified by the SQL. In some embodiments, the SQL may further identify or include specific values which are to be generated based on the case data. For instance, the SQL may include a SUM clause, identifying identifiers (e.g., columns) or values of the case data which are to be aggregated or summed to generate additional case data. In another example, the SQL may include a COUNT clause or function, identifying identifiers (e.g., columns/column headers, case data identifiers, etc.) or values of the case data which are to be counted to generate additional case data. For instance, the SQL may include a COUNT clause identifying a specific column header (e.g., case_seriousness_v) and a value "Serious". Then, to execute the query and generate additional case data, the second case repository 146 may count the number of "Serious" value in the column identified by the specific column header. Once the second case repository 146 has selected and organized the case data and/or generated additional case data, the second case repository 146 may then provide the selected (and/or generated additional) case data to the provider computing system 104 (e.g., the data analysis and report generation circuit 145).

In some embodiments, before step 412 the provider computing system 104 may partially execute the query on the second case repository 146 to select a specific number of data records (e.g., rows or columns) of case data. In some embodiments, each data record may include or represent a single case dataset. For instance, the user of the client computing device 112 may want to determine the potential outcome of a query and select a preview button 726. In response to the selection, the client computing device 112 may generate a request for a preview of query template provide the request to the provider computing system 104. In response, the provider computing system 104 may partially execute the query on the second case repository 146 to select a specific number of records (e.g., 100 records of case data, 10 records of case data, 1,000 records of case data, etc.) and provide the specific number of records of case data to the client computing device 112 for display thereon.

By providing for a preview of a specific query via the preview button 726, the present systems and methods provide for reduced errors and unexpected results as well as improved efficiency. For instance, because the present systems and methods include a preview button 526 that, when selected may generate a request for a preview of the query to select a specific number of records, the present systems and methods provide for identification of any syntax errors or logical mistakes before running the entire query. This helps prevent unexpected results or errors that might corrupt data or require rewriting the entire query. Likewise by utilizing a preview, the present systems and methods show a limited set of results based on the current query. This allows for assessment of the query without committing to processing the entire dataset. This can save time and resources, especially when working with large datasets, thereby requiring less process power and memory.

Figure 7A:
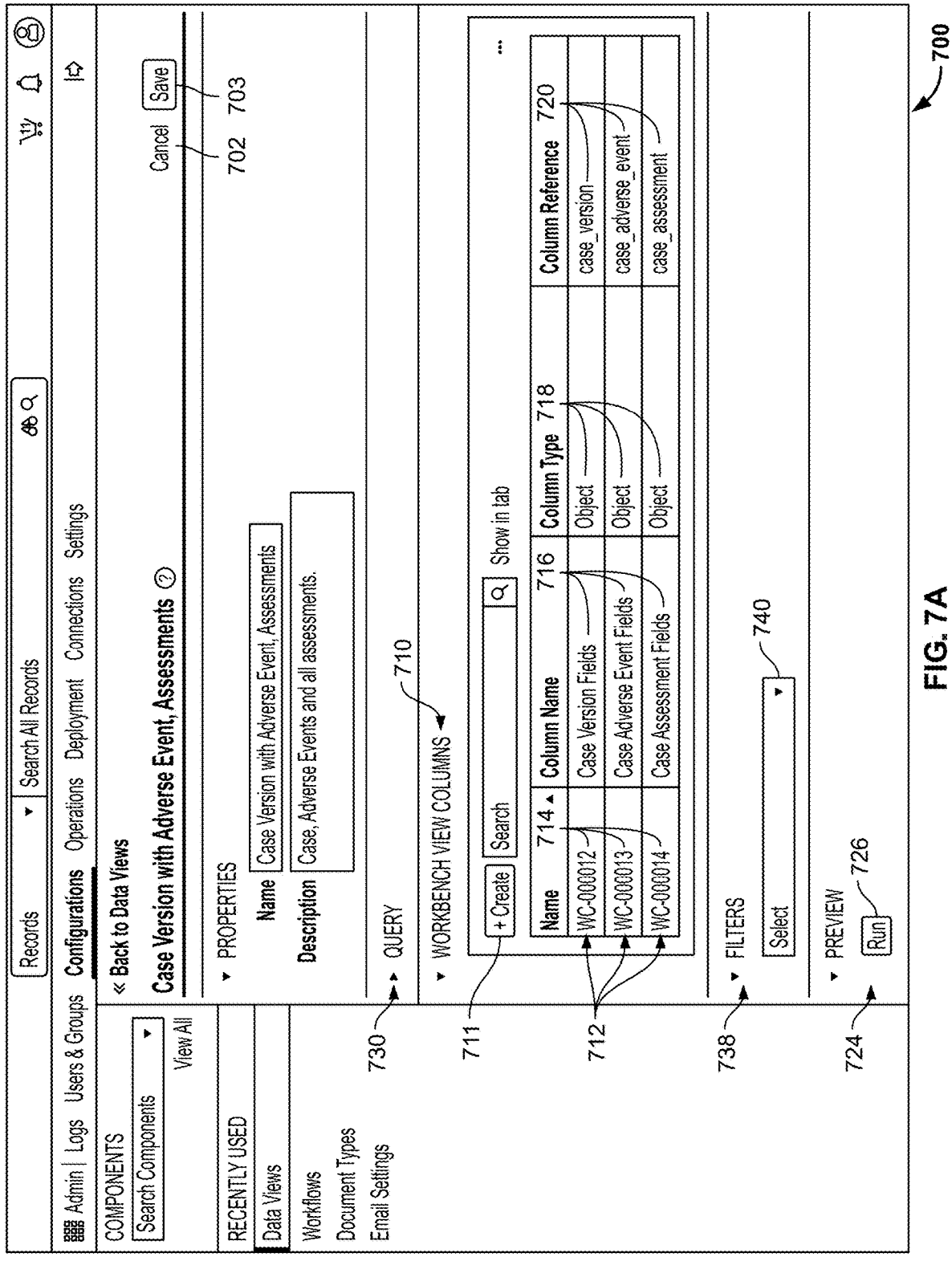
FIGS. 7A-7C may be illustrations of some aspects of a user interface generated by the case processing and analysis system of FIG. 1 to manage a query template, according to an example embodiment.

In some embodiments, the query template may identify another query template or case series, on which the query template is dependent. For instance, as shown in FIG. 7C, the query template may identify another query template (e.g., "PADER Case Selection") on which the query template is dependent. Accordingly, in some embodiments, at step 412, the provider computing system 104 may execute a first query to select case data from the second case repository 146. Then, based on the selected case data, the provider computing system 104 may execute a second query to select case data from the selected case data or the case series. In some embodiments, the provider computing system 104 may execute two queries when generating additional case data. For instance, in the example shown in FIG. 7C, the first query selects specific case data. Then, the second query generates additional case data by summing or totaling the specific number of certain values (e.g., the total number of "serious_domestic_cases," the total number of "serious_foreign_cases," etc.). In some embodiments, this process may be repeated until reaching a query template which is not dependent on another query template. For instance, the provider computing system 104 may receive or select a first query template including a first query, which is dependent on a second query template including a second query, which is dependent on a third query template including a third query, which is not dependent on a query template. Accordingly, at step 412, the provider computing system 104 may execute the third query to select case data. Next, the provider computing system may execute the second query to select case data returned by the third query. Next, the provider computing system 104 may execute the first query to select case data returned by the second query.

In some embodiments, when the query template identifies another query, on which the query template is dependent, the provider computing system 104 may add a clause or statement to the first query to select case data from the second case repository 146. For instance, the provider computing system 104 may add a SELECT clause to the forefront of the first query such that the first query executes on case data selecting and generated based on the dependent query. In this regard, the nested or dependent query may be executed and added to the first query while the provider computing system 104 is compiling the first query.

Method 600 provides an example of a dependent query generated using a case series. For instance, at step 412, the provider computing system 104 may execute a first query to select case data from the second case repository 146 and generate a case series. The case data may be used to populate a digital file (as discussed with regard to the method 400). Then, the provider computing system 104 may execute a second query, which is dependent on the first query, based on the case series. The case series may be a set of case version identifiers, thereby identifying each case dataset selected in the first query while not copying the entire set of case data. Accordingly, the second query may be executed and the select subset of case datasets identified in the case series.

In some embodiments, the provider computing system 104 may further provide the metadata to the second case repository 146, as a part of the query, and the second case repository 146 may organize the case data based on the metadata. For instance, the metadata may be populated, by the provider computing system 104, into the query of the query template, and the second case repository 146 may arrange or organize the selected case data. For instance, the provider computing system 104 may populate or add a "SELECT" clause to the SQL, which corresponds to the metadata. For example, in response to the query template including a first piece of metadata including the case_version_v case data identifier, the provider computing system 104 may add a SELECT clause to the SQL which includes the case_version_v case data identifier.

In other embodiments, once the provider computing system 104 has executed the query, the method 400 proceeds to step 416 where the provider computing system 104 organizes the selected case data based on the metadata of the query template. The metadata may include names or other metadata of the selected case data, which are to be organized in columns or rows. For instance, the query may include clauses including case data identifiers. Accordingly, at step 408, the provider computing system 104 may execute the query and retrieve the case data identified by the case data identifiers. Likewise, the metadata may identify the case data identifiers and select the specific rows or columns the case data is to be organized or arranged into.

In some embodiments, the metadata may be selected based on the case data identifiers of the query. For instance, as shown in FIG. 7A, the query template may include three pieces of metadata: a first piece of metadata representing a first column ("Case Version Fields") and including the case_version_v case data identifier; a second piece of metadata representing a second column ("Case Adverse Event Fields") and including the case_adverse_event_v case data identifier; and a third piece of metadata representing a second column ("Case Assessment Fields") and including the case_assessment_v identifier. In this regard, when organizing or arranging the selected case data, the provider computing system 104 may arrange the selected case data such that it includes three columns (one for each piece of metadata). The first column will include case data of the case_version_v case data identifier. The second column will include case data of the case_adverse_event_v case data identifier. The third column will include case data of the case_assessment_v identifier. In this regard, the provider computing system 104 may arrange or organize the selected case data based on the metadata of the query template.

In some embodiments, the query template may include one or more filter preferences. Then, after step 416, the provider computing system 104 may filter the selected case data to remove records of the organized case data which does not match the filter preferences. For instance, the filter preference may identify a specific medical product (e.g., "product_v==drug_x"). Then, for each record of case data which does not match the filter preference, the provider computing system 104 may filter the case data by removing the non-matching records. In other embodiments, in response to the query template including a filter, the provider computing system 104 may populate by the query of the query template with the filter preference, and the second case repository 146 may filter the selected case data. For instance, in response to the filter preference "product_v==drug_x" the provider computing system 104 may populate the SQL with a "CASE" clause including a "WHEN" statement or clause. In other embodiments, the filters may be utilized, by the provider computing system 104, when generating the digital file and filtering the organized case data, as described with respect to step 428.

Figure 8A:
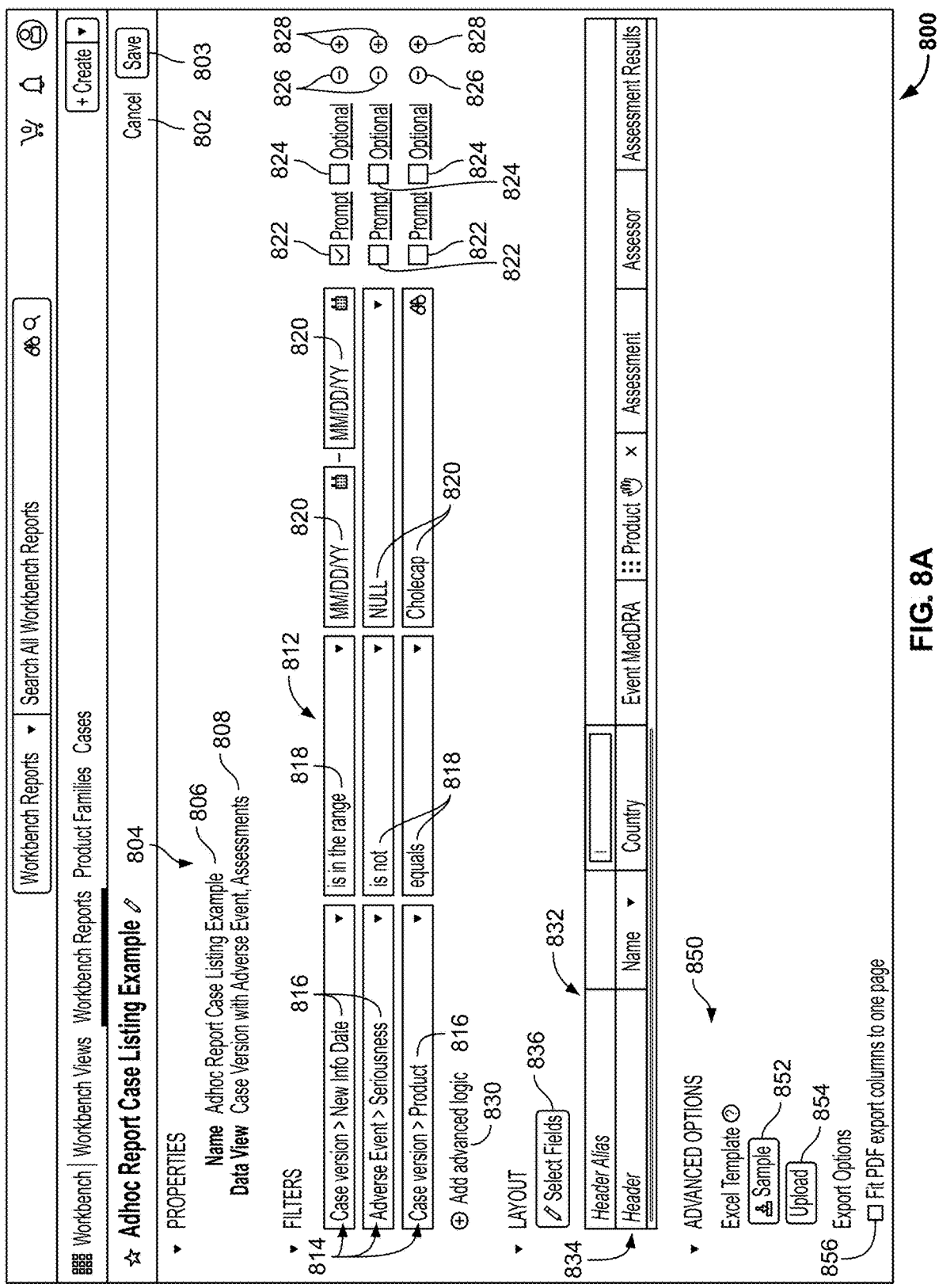
FIGS. 8A-8C may be illustrations of some aspects of a user interface generated by the case processing and analysis system of FIG. 1 to manage a digital file template, according to an example embodiment.
Figure 8B:
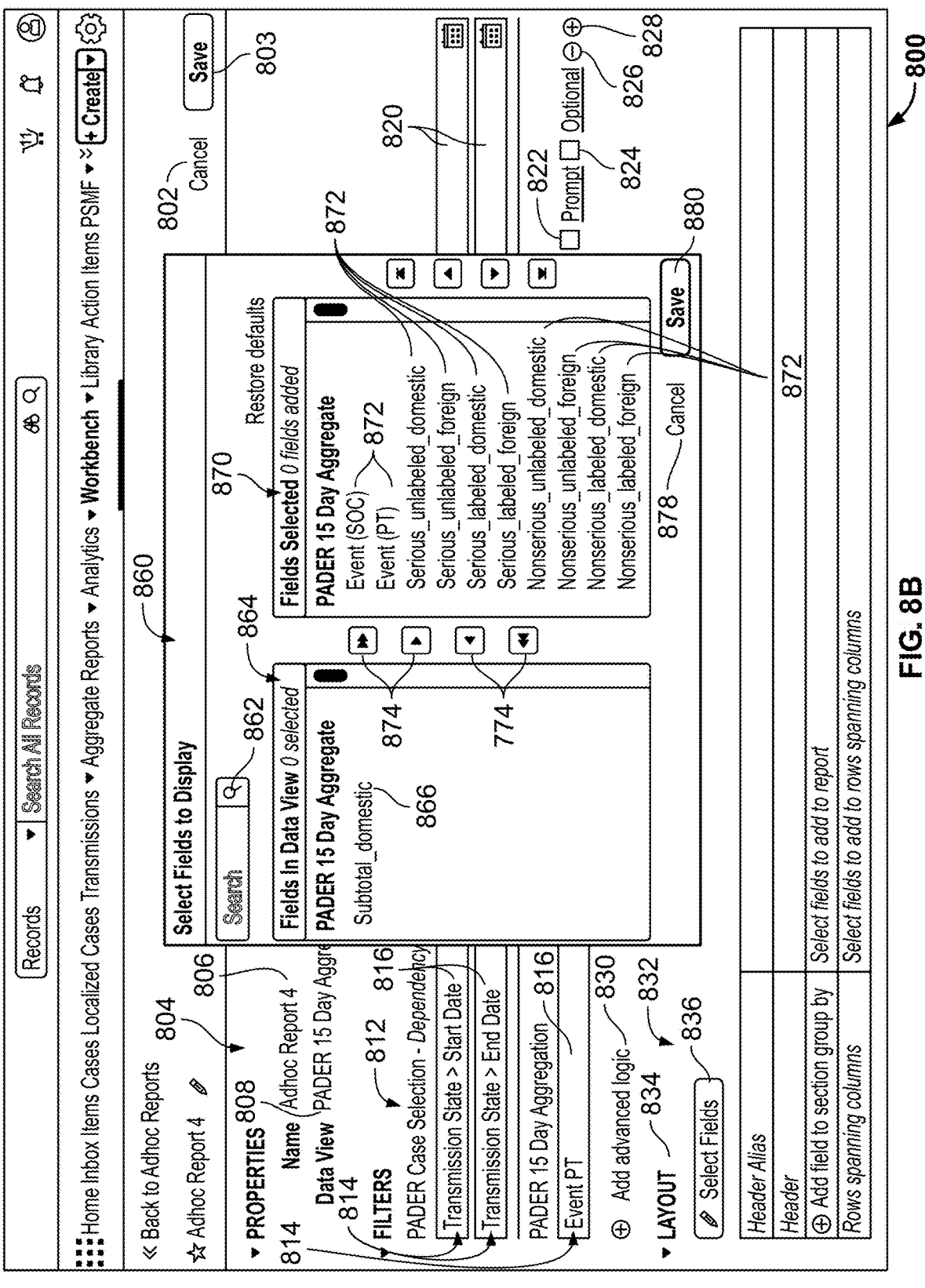
Figure 8C:
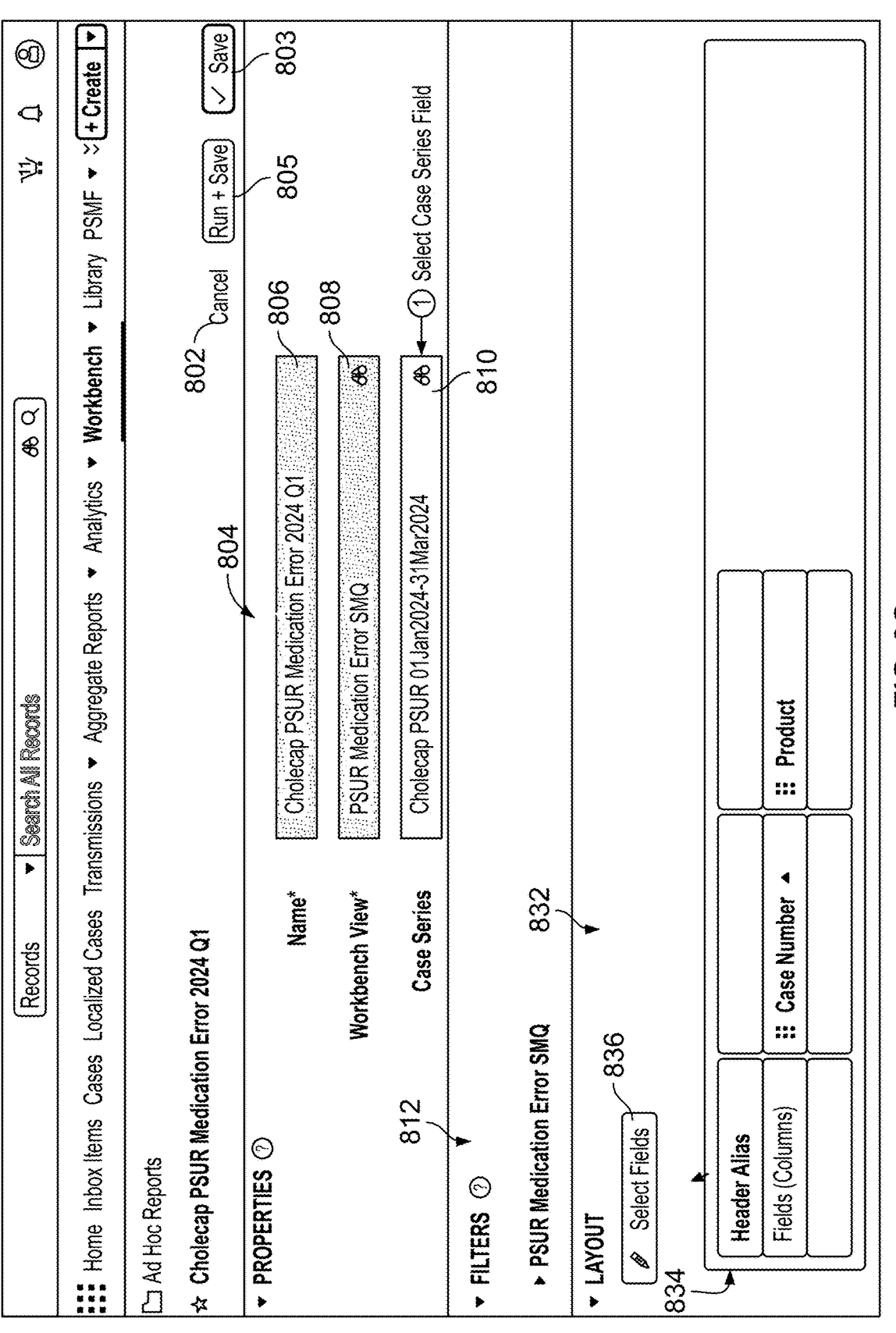

Once the provider computing system 104 has organized the case data, the method 400 proceeds to step 420 at which the provider computing system 104 receives a request to generate a digital file. In some embodiments, the request to generate the digital file may be received from one of the client computing devices 112. In some embodiments, the request to generate the digital file may include or identify a specific digital file template of the digital file repository 148. In other embodiments, the request to generate the digital file may include a digital file layout and one or more filters which are to be applied to the selected and organized case data. In some embodiments, the request to generate the digital file and/or the digital file template may identify or include the query template, from which organized case data is to be used to generate the digital file. For instance, as shown in FIGS. 8A-8C, the digital file template may include a query template field 808 which identifies the query template which was used to select and organize case data that is to be included in the digital file. In some embodiments, the digital file template may identify multiple query templates (e.g., a first query template which is dependent on a second query template). In this regard, the query template and the digital file template may be used in combination and in order to generate the digital file, where the query template may be used to query the case data, and the digital file template may be used to filter the case data and generate the digital file including at least a portion of the case data.

In some embodiments, the request received at step 404 may identify or include the query template and a digital file template. As a result, after step 416, the provider computing system 104 may proceed to step 424 to select or retrieve the digital file template identified by the request.

In some embodiments, the method 400 may be repeated at a specific frequency (e.g., every week, every day or 24 hours, every three days, every month, every three months, etc.). For instance, at step 404, the provider computing system 104 may receive a request identifying the query template, the digital file template, and the frequency. Accordingly, the provider computing system 104 may proceed through the method 400 (e.g., select the query template, execute the query, organized the case data, generate a digital file, output the digital file, etc.) at the identified frequency (e.g., every 5 days).

Once the provider computing system 104 has received the request to generate the digital file, the method 400 proceeds to step 424 at which the provider computing system 104 selects the digital file template from the digital file repository 148. The digital file template may include a digital file layout and one or more filters or filter preferences. The digital file layout may define the columns and rows to be included in the digital file and how they are to be populated with the organized case data. Likewise, the filters or filter preferences may define specific criteria or values the records of the organized case data are to include. For instance, the filters may include a specific medical product, seriousness, adverse event (e.g., MedDRA term or code), expectedness, and the like.

Once the provider computing system 104 has selected the digital file template, the method 400 proceeds to step 428 at which the provider computing system 104 generates a digital file based on the digital file template and the organized case data. In some embodiments, to generate the digital file, the provider computing system 104 may generate the digital file and then arrange or assemble the organized case data within the digital file based on the digital file layout. The digital file layout may specify or identify the names of columns and rows, the data to be included in columns and rows, the arrangement or sorting of columns and rows, columns and rows which are to be merged (e.g., a single column header including two columns), sections which are to be included in the digital file, the data to be included in each of the sections, the arrangement or sorting of the sections, and the like. For instance, FIGS. 8A-8C show a digital file layout 834 which is generated by the client computing device 112 and provided to the provider computing device 104 for storage and use therein. In this regard, the digital file layout may specify or identify formatting of the digital file as well as how the case data is to be arranged and added to the digital file. In this regard, the digital file may include at least a portion of the selected and organized case data.

In some embodiments, the digital file layout and/or the digital file generation request may include or identify a file type which the digital file is to be generated as. For instance, the digital file may be generated as a CSV file, an Excel File (XLSX file), an XML file, a JSON file, a PDF file, and the like. By allowing the user to decide the specific file type of the digital file in the digital file layout or the digital file generation request and not only generating the digital file as one specific file type, the provider computing system 104 may provide for improved shareability of the digital file as well as use less processing power and memory. For example, in situations where the digital file is only generated as a specific, non-dynamic, file type, third-party computing systems and recipient computing devices (e.g., the partner computing system 108) may have to perform additional file modification and conversion or request the provider computing system 104 to do so, which requires additional processing power, memory (to keep two files), and time. In comparison, the system 100 and the provider computing system 104 allow the user to specify the file type of the digital file through the digital file generation request. Accordingly, the user can specify the wanted file type the first time and the provider computing system 104 will generate the digital file as the specified file type. As a result, no additional file modification or conversion is required reducing processing power usage, memory usage, and overall processing time for the provider computing system 104.

In some embodiments, the digital file template and/or digital file generation request may include a layout file. The layout file may be an Excel file that includes specific formatting and identifies the arrangement of the case data. For instance, FIG. 11 shows an example first layout file 1100, and FIG. 14 shows an example second layout file 1400, which may each be provided to the provider computing system 104 by one of the client computing devices 112. The layout file 1100 or 1400 may be used in place of the digital file layout and provide an interface for additional formatting and data arrangement as compared to the digital file layout. In some embodiments, the provider computing system 104 may populate the digital layout file based on the values included therein (e.g., the case data identifiers). In some embodiments, the provider computing system 104 may automatically split rows or columns in which the corresponding case data identifier includes multiple values. For instance, in the second digital layout file 1400, one column includes the case data identifier "case_version_c-.caseproduct". Likewise, as shown in a third digital file 1500 generated based on the second digital file layout file 1400, the case in question includes multiple case products (product 1 and product 2). As a result, the provider computing system 104 may automatically split the row for each product when generating the digital file. Similarly, the provider computing system 104 may arrange the data, based on the digital layout file, such that specific values may be located below each row of a specific case (such as the case comments).

In some embodiments, prior to generating the digital file (e.g., at or before step 428), the provider computing system 104 may first filter the organized case data based on the filters of the digital file template and/or the query template. For instance, as described herein, the query template and/or the request to query the second case repository 146 may include one or more filter preferences which are to be applied to the case data. In this regard, the provider computing system 104 may select the filters of the query template and/or the filters of the digital file template and filter the organized case data based on the filters. For instance, filters may include or identify specific case fields or values the case data is to include. For instance, the filters may include or identify a case date (e.g., new info date, original date), a case seriousness (e.g., serious, non-serious, etc.), a case expectedness (expected, unexpected, etc.), an adverse event (e.g., a MedDRA code, a MedDRA term), a medical product (e.g., drug x, drug y), a substance of the medical product (e.g., substance xyz, substance xy, etc.), a study (e.g., study 123, study 234, etc.), a country or region of the case (e.g., USA, Europe, France, China, etc.), a state of the case (e.g., complete, data entry complete, submitted, etc.), a health agency (e.g., FDA, EMA, Health Canada, etc.), and the like. Likewise, the filter preferences may define specific criteria or values the records of the organized case data are to include. For instance, the filter preferences may include a specific medical product, seriousness, adverse event (e.g., MedDRA term or code), expectedness, and the like. Further, the filter preferences may include logical operators between the criteria (e.g., (Adverse Event==Arm Pain) && (Medical Product==Drug X), etc.). The logical operators may define specific conditions which are to be met for the case data to pass the filters. In this regard, the provider computing system 104 may filter the case data by removing data records which do not match the case data. For instance, in response to a data record not including a specific medical product of the filter preferences, the provider computing system 104 may remove the data record from the case data. The provider computing system 104 may then generate the digital file based on the digital file layout and the filtered case data.

Once the provider computing system 104 has generated the digital file, the method 400 proceeds to step 432 at which the provider computing system 104 outputs the digital file. In some embodiments, the request to generate the digital file may include an electronic or digital address (e.g., an email address, an IP address, a file transfer protocol (FTP) address, etc.) to which the digital file is to be output. In other embodiments, the provider computing system 104 may receive a third request including an address to which the file is to be output (e.g., in response to a selection of a button, as will be described further herein). Then, the provider computing system 104 may transmit or output the digital file to the digital address. In some embodiments, the provider computing system 104 may output the digital file to at least one of the partner computing systems 108 and/or the client computing devices 112.

Referring now to FIG. 5, a method 500 of generating and executing a query on a column-oriented repository is shown, according to an example embodiment. Method 500 can be carried out by the system of FIG. 1. More particularly, the method 500 can be carried out by the processing circuit 128 of the provider computing system 104 and through communication with the partner computing systems 108 and the client computing devices 112.

Method 500 commences at step 504 at which the provider computing system 104 receives a request for case data. In some embodiments, the request may identify or include a query template of the query repository 147. In some embodiments, the request may be received from one of the client computing devices 112. In some embodiments, the request may identify one or more changes or additions to the query template. For instance, the request may identify the query template and one or more (additional) filter preferences, one or more (additional) pieces of metadata, one or more secondary queries to be performed, and the like. In other embodiments, the request may include a query (e.g., SQL representing the query) and/or metadata which defines how the selected case data is to be organized. In this regard, because the request includes the query to be executed, the provider computing system 104 may skip step 508 and proceed to step 512 where the query is executed.

Once the provider computing system 104 has received the request, the method 500 proceeds to step 508 at which the provider computing system 104 selects or retrieves the query template from the query repository 147. As described herein, the query template may include a query (e.g., SQL representing a query), one or more pieces of metadata (e.g., case data identifiers, and one or more filter preferences.

Once the provider computing system 104 has selected the query template from the query repository 147, the method 500 may proceed to step 512 at which the provider computing system 104 executes the query of the query template on the second case repository 146 to select case data. For instance, the provider computing system 104 may validate the SQL of the query and provide the SQL to the second case repository 146. The second case repository 146 may receive the SQL and execute the SQL on the stored case datasets to select specific case data identified by the SQL. For instance, the SQL may include a "SELECT" clause identifying multiple case data identifiers (e.g., "controlled_vocabulary.id," "e2b_code_v," etc.). In response, the second case repository 146 may retrieve the case data identified by the SQL. In some embodiments, the SQL may further identify or include specific values which are to be generated based on the case data. For instance, the SQL may include a SUM clause, identifying identifiers or values of the case data which are to be aggregated or summed to generate additional case data. Once the second case repository 146 has selected and organized the case data and/or generated additional case data, the second case repository 146 may then provide the selected (and/or generated additional) case data to the provider computing system 104 (e.g., the data analysis and report generation circuit 145).

In some embodiments, before step 512 the provider computing system 104 may partially execute the query on the second case repository 146 to select a specific number of data records (e.g., rows or columns) of case data. In some embodiments, each data record may include or represent a single case dataset. For instance, the user of the client computing device 112 may want to determine the potential outcome of a query and select a preview button 726. In response to the selection, the client computing device 112 may generate a request for a preview of query template provide the request to the provider computing system 104. In response, the provider computing system 104 may partially execute the query on the second case repository 146 to select a specific number of records (e.g., 100 records of case data, 10 records of case data, 1,000 records of case data, etc.) and provide the specific number of records of case data to the client computing device 112 for display thereon.

By providing for a preview of a specific query via the preview button 726, the present systems and methods provide for reduced errors and unexpected results as well as improved efficiency. For instance, because the present systems and methods include a preview button 726 that, when selected may generate a request for a preview of the query to select a specific number of records, the present systems and methods provide for identification of any syntax errors or logical mistakes before running the entire query. This helps prevent unexpected results or errors that might corrupt data or require rewriting the entire query. Likewise by utilizing a preview, the present systems and methods show a limited set of results based on the current query. This allows for assessment of the query without committing to processing the entire dataset. This can save time and resources, especially when working with large datasets, thereby requiring less process power and memory.

In some embodiments, the query template may identify another query template, on which the query template is dependent. For instance, as shown in FIG. 7C, the query template may identify another query template or case series (e.g., "PADER Case Selection") on which the query template is dependent. Accordingly, in some embodiments, at step 512, the provider computing system 104 may execute a first query to select case data from the second case repository 146 and generate a case series. Then, based on the selected case data, the provider computing system 104 may execute a second query to select case data from the selected case data. In some embodiments, the provider computing system 104 may execute two queries when generating additional case data. For instance, in the example shown in FIG. 7C, the first query selects specific case data. Then, the second query generates additional case data by summing or totaling the specific number of certain values (e.g., the total number of "serious_domestic_cases," the total number of "serious_foreign_cases," etc.). In some embodiments, this process may be repeated until reaching a query template which is not dependent on another query template. For instance, the provider computing system 104 may receive or select a first query template including a first query, which is dependent on a second query template including a second query, which is dependent on a third query template including a third query, which is not dependent on a query template. Accordingly, at step 512, the provider computing system 104 may execute the third query to select case data. Next, the provider computing system may execute the second query to select case data returned by the third query. Next, the provider computing system 104 may execute the first query to select case data returned by the second query.

Method 600 provides an example of a dependent query generated using a case series. For instance, at step 512, the provider computing system 104 may execute a first query to select case data from the second case repository 146 and generate a case series. The case data may be used to populate a digital file (as discussed with regard to the method 400). Then, the provider computing system 104 may execute a second query, which is dependent on the first query, based on the case series. The case series may be a set of case version identifiers, thereby identifying each case dataset selected in the first query while not copying the entire set of case data. Accordingly, the second query may be executed and the select subset of case datasets identified in the case series.

In some embodiments, the provider computing system 104 may further provide the metadata to the second case repository 146, as a part of the query, and the second case repository 146 may organize the case data based on the metadata. For instance, the metadata may be populated, by the provider computing system 104, into the query of the query template, and the second case repository 146 may arrange or organize the selected case data. For instance, the provider computing system 104 may populate or add a "SELECT" clause to the SQL, which corresponds to the metadata. For example, in response to the query template including a first piece of metadata including the case_version__v case data identifier, the provider computing system 104 may add a SELECT clause to the SQL which includes the case_version_v case data identifier.

In other embodiments, once the provider computing system 104 has executed the query, the method 500 proceeds to step 516 where the provider computing system 104 organizes the selected case data based on the metadata of the query template. The metadata may include names or other metadata of the selected case data, which are to be organized in columns or rows. For instance, the query may include clauses including case data identifiers. Accordingly, at step 408, the provider computing system 104 may execute the query and retrieve the case data identified by the case data identifiers. Likewise, the metadata may identify the case data identifiers and select the specific rows or columns the case data is to be organized or arranged into.

In some embodiments, the metadata may be selected based on the case data identifiers of the query. For instance, as shown in FIG. 7A, the query template may include three pieces of metadata: a first piece of metadata representing a first column ("Case Version Fields") and including the case_version_v case data identifier; a second piece of metadata representing a second column ("Case Adverse Event Fields") and including the case_adverse_event_v case data identifier; and a third piece of metadata representing a second column ("Case Assessment Fields") and including the case_assessment_v identifier. In this regard, when organizing or arranging the selected case data, the provider computing system 104 may arrange the selected case data such that it includes three columns (one for each piece of metadata). The first column will include case data of the case_version_v case data identifier. The second column will include case data of the case_adverse_event_v case data identifier. The third column will include case data of the case_assessment_v identifier. In this regard, the provider computing system 104 may arrange or organize the selected case data based on the metadata of the query template.

In some embodiments, the query template may include one or more filter preferences. Then, after step 516, the provider computing system 104 may filter the selected case data to remove records of the organized case data which does not match the filter preferences. For instance, the filter preference may identify a specific medical product (e.g., "product_v==drug_x"). Then, for each record of case data which does not match the filter preference, the provider computing system 104 may filter the case data by removing the non-matching records. In other embodiments, in response to the query template including a filter, the provider computing system 104 may populate by the query of the query template with the filter preference, and the second case repository 146 may filter the selected case data. For instance, in response to the filter preference "product_v==drug_x" the provider computing system 104 may populate the SQL with a "CASE" clause including a "WHEN" statement or clause. In other embodiments, the filters may be utilized, by the provider computing system 104, when generating the digital file and filtering the organized case data, as described with respect to step 528.

Once the provider computing system 104 has organized the case data, the method 500 proceeds to step 520 at which the provider computing system 104 receives a request to display the case data on a page of a graphical user interface. In some embodiments, the request to display the case data may be received from one of the client computing devices 112. In some embodiments, the request to display the case data on a page may include or identify a specific page template of the page repository 149. In other embodiments, the provider computing system 104 may determine the account or user associated with the client computing device 112 (from which the request was received) and determine a page template of the page repository 149 associated with the account.

In some embodiments, the request received at step 504 may identify or include the query template and the page template. As a result, after step 516, the provider computing system 104 may proceed to step 524 to select or retrieve the page template identified by the request.

In some embodiments, the method 500 may be repeated at a specific frequency (e.g., every week, every day or 24 hours, every three days, every month, every three months, etc.). For instance, at step 504, the provider computing system 104 may receive a request identifying the query template, the page template, and the frequency. Accordingly, the provider computing system 104 may proceed through the method 500 (e.g., select the query template, execute the query, organized the case data, output the case data, etc.) at the identified frequency (e.g., every 24 hours).

Once the provider computing system 104 has received the request to generate the digital file, the method 500 proceeds to step 524 at which the provider computing system 104 selects the page template from the page repository 149. As described herein, the page template may include one or more tabs with each tab including one or more modular components and a modular component layout. The tabs may be specific views which are displayed on the webpage and each include multiple modular components that analyze and display selected portions of the case data (source data). For instance, a first tab may include nine modular components (five tables, two pie charts, and two lines charts) and a layout for displaying the nine modular components. Likewise, each modular component may include one or more data sources defining how the modular component is populated. For instance, a specific line chart modular component may define a data source of the case data for the x-axis (e.g., date) of the line chart and a specific data source for the y-axis (e.g., case count) of the line chart. Then, based on the data sources, the modular components may be populated and displayed on the page.

Once the provider computing system 104 has selected the page template, the method 500 proceeds to step 528 at which the provider computing system 104 outputs at least a portion of the selected and/or generated case data for display and arrangement on the page based on the page template. For instance, at step 528, the provider computing system 104 may output the case data to one of the client computing devices 112 for display and arrangement on the page. For instance, the tabs and modular components may be populated with the defined data sources and displayed in the arrangement defined in the page template. FIG. 10A shows the example dashboard page 1000 with three tabs 1006 and multiple modules 1012. In some embodiments, the provider computing system 104 may only output the case data defined or indicated by the data sources of each modular component. In other embodiments, the provider computing system 104 may output all of the case data to the client computing device 112, such that additional filtering and selection of data sources may take place (e.g., in the filter section 1022).

In some embodiments, the provider computing system 104 and the corresponding client computing device 112 may populate each modular component of the dashboard page, in parallel (e.g., at the same time). For instance, the provider computing system 104 may run multiple queries, for the data of each data source, to generate and select the corresponding case data for display and arrangement on the modular components.

Referring now to FIG. 6, a method 600 of generating a case series is shown, according to an example embodiment. Method 600 can be carried out by the system of FIG. 1. More particularly, the method 600 can be carried out by the processing circuit 128 of the provider computing system 104 and through communication with the partner computing systems 108 and the client computing devices 112.

Method 600 commences at step 604 at which the provider computing system 104 receives a request for case data. In some embodiments, the request may identify or include a query template of the query repository 147. In some embodiments, the request may be received from one of the client computing devices 112. In some embodiments, the request may identify one or more changes or additions to the query template. For instance, the request may identify the query template and one or more (additional) filter preferences, one or more (additional) pieces of metadata, one or more secondary queries to be performed, and the like. In other embodiments, the request may include a query (e.g., SQL representing the query) and/or metadata which defines how the selected case data is to be organized. In this regard, because the request includes the query to be executed, the provider computing system 104 may skip step 608 and proceed to step 612 where the query is executed.

Once the provider computing system 104 has received the request, the method 600 proceeds to step 608 at which the provider computing system 104 selects or retrieves the query template from the query repository 147. As described herein, the query template may include a query (e.g., SQL representing a query), one or more pieces of metadata (e.g., case data identifiers, and one or more filter preferences.

Once the provider computing system 104 has selected the query template from the query repository 147, the method 600 may proceed to step 612 at which the provider computing system 104 executes the query of the query template on the second case repository 146 to select case data. For instance, the provider computing system 104 may validate the SQL of the query and provide the SQL to the second case repository 146. The second case repository 146 may receive the SQL and execute the SQL on the stored case datasets to select specific case data identified by the SQL. For instance, the SQL may include a "SELECT" clause identifying multiple case data identifiers (e.g., "controlled_vocabulary.id," "e2b_code_v," etc.). In response, the second case repository 146 may retrieve the case data identified by the SQL. In some embodiments, the SQL may further identify or include specific values which are to be generated based on the case data. For instance, the SQL may include a SUM clause, identifying identifiers or values of the case data which are to be aggregated or summed to generate additional case data. Once the second case repository 146 has selected and organized the case data and/or generated additional case data, the second case repository 146 may then provide the selected (and/or generated additional) case data to the provider computing system 104 (e.g., the data analysis and report generation circuit 145).

Once the provider computing system 104 has executed the query to select first case data, the method 600 may proceed to step 616 at which the provider computing system 104 adds each case identifier of the selected case data to a case group (also referred to as a case series). For instance, when executing the query at step 612, the provider computing system 104 may select case data including 4,000 case datasets. Each case dataset may include a case identifier (e.g., a case UID, a case version identifier, etc.). Accordingly, to mark the cases representing the first case data, the provider computing system 104 may add each case identifier to a case group or case series. The case series may be a placeholder that represents the case data of the first query in a smaller data format than the case data itself. For instance, the case data may include multiple fields and/or portions (e.g., case name, case adverse event(s), case medical product(s), case reporter(s), case identifier(s), etc.), whereas the case series may only include a listing of the case identifiers. In this way, the case series can be used by the provider computing system 104 to select a subset of the first case data without having to store and manage the entire set of case data itself.

In some embodiments, after generating the case group, the provider computing system 104 may output the case series. For instance, the provider computing system 104 may generate a case series file (e.g., an excel file, a CSV file, etc.) including each case identifier of the case series, and output the digital file. In one example, the provider computing system 104 may output the case series file to one of the client computing devices 112 in response to a selection of a case series button 921, as will be described further herein.

Once the provider computing system 104 has generated the case group, the method 600 proceeds to step 620 at which the provider computing system 104 receives a request to execute a second query based on the case group or series. The request may be received from one of the client computing devices 112. Likewise, the request may identify or include a query template of the query repository 147. In other embodiments, the request may include a query (e.g., SQL representing the query) and/or metadata which defines how the selected case data is to be organized. In some embodiments, after step 620, the provider computing system 104 may retrieve a second query template from the query repository 147. In other embodiments, the provider computing system 104 may proceed to step 624.

In some embodiments, prior to step 620, the provider computing system 104 may receive a case series file including or identifying the case series and the case identifiers thereof. Then, the provider computing system 104 may proceed to step 624 where a request to execute a second query is received. In some embodiments, the request may include the case series file. In some embodiments, the request may be to output the case series to the case intake and management circuit 142. Accordingly, in response to receiving the request, the provider computing system 104 may output the case series to the case intake and management circuit 142.

Once the provider computing system 104 has received the request, the method 600 proceeds to step 624 at which the provider computing system 104 executes the second query on the second case repository 146 to select and/or generate second case data. Because the request identified the case series or case group, the second case data may be a subset of the first case data. For instance, at step 624, the provider computing system 104 may provide the case series (and the case version identifiers thereof) to the second case repository 146 to solely query and execute based on the first case data. Then, based on the first case data, the second query may be executed to generate and/or select the second case data. For instance, the first case data may include 5,000 case datasets. Accordingly, the second case data may include a subset of 1,000 case datasets from the original 5,000 case datasets.

Referring now to FIGS. 7A-10B, user interfaces shown and displayed to the user of the one or more client computing devices 112 during the methods 200, 300, 400, 500, and/or 600 are shown, according to example embodiments. As described herein, the user interfaces of FIGS. 7A-10B may be one or more of web interfaces generated by the provider computing system 104 and rendered by each of the client computing devices 112 as part of a web application or graphical user interfaces downloaded and generated by each of the client computing devices 112 as part of a software application (e.g., a mobile application, etc.). Further, the user interfaces shown on FIGS. 7A-10B allow for communication between the user and the provider computing system 104 via the respective client computing device 112 (specifically via the I/O circuit 180). Through interaction with the various user interfaces, the user may provide user input, feedback, and other data requested by the provider computing system 104. In this regard, it should be understood that each interaction described herein by the user with the user interfaces of FIGS. 7A-10B may be provided to one or more of the client computing devices 112 and then transmitted to the provider computing system 104 and that each action described herein as occurring to the respective client computing device 112 (e.g., navigating to a certain page, generating a popup, etc.) may be performed by the provider computing system 104.

Figure 7B:
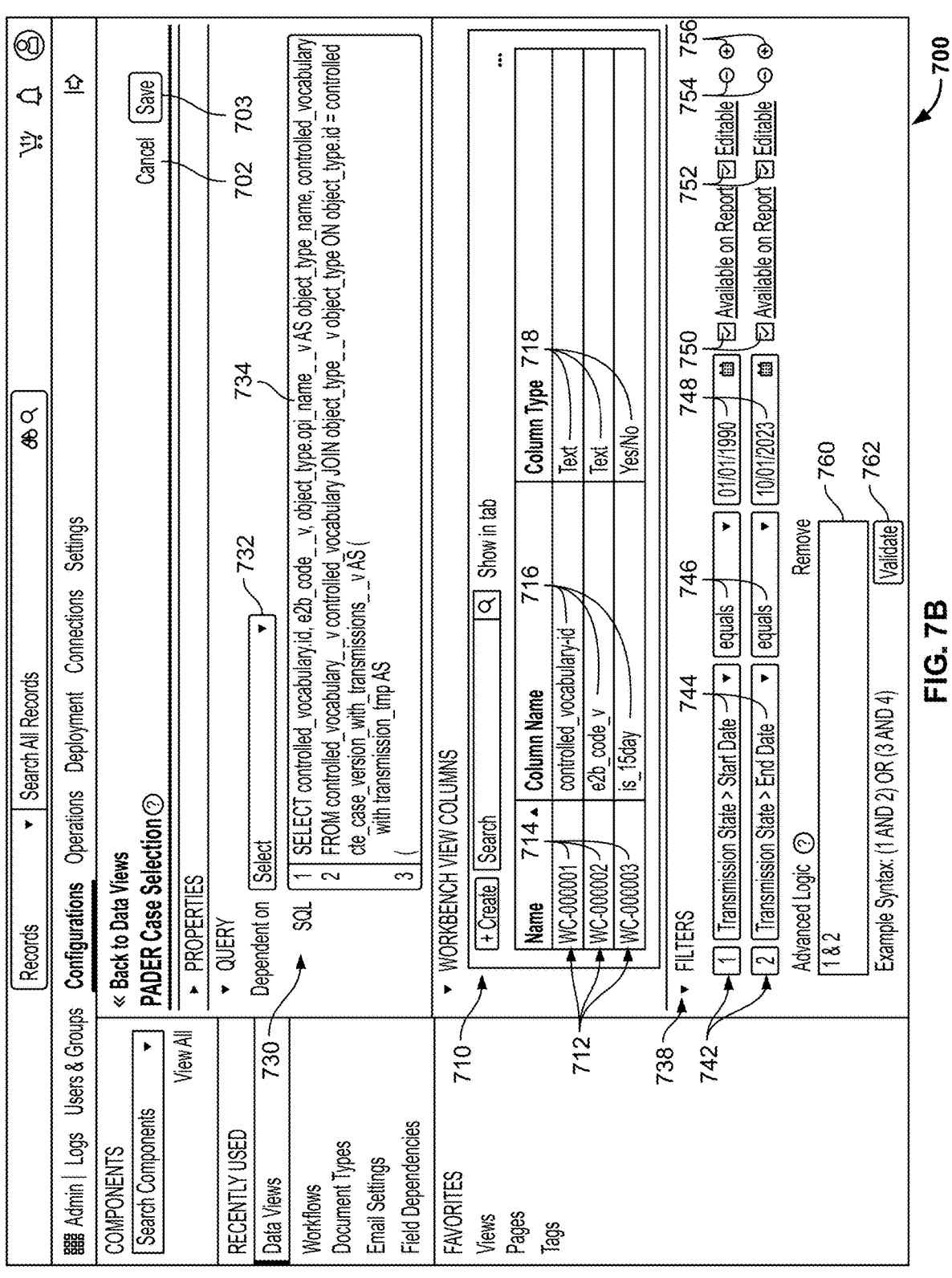
Figure 7C:
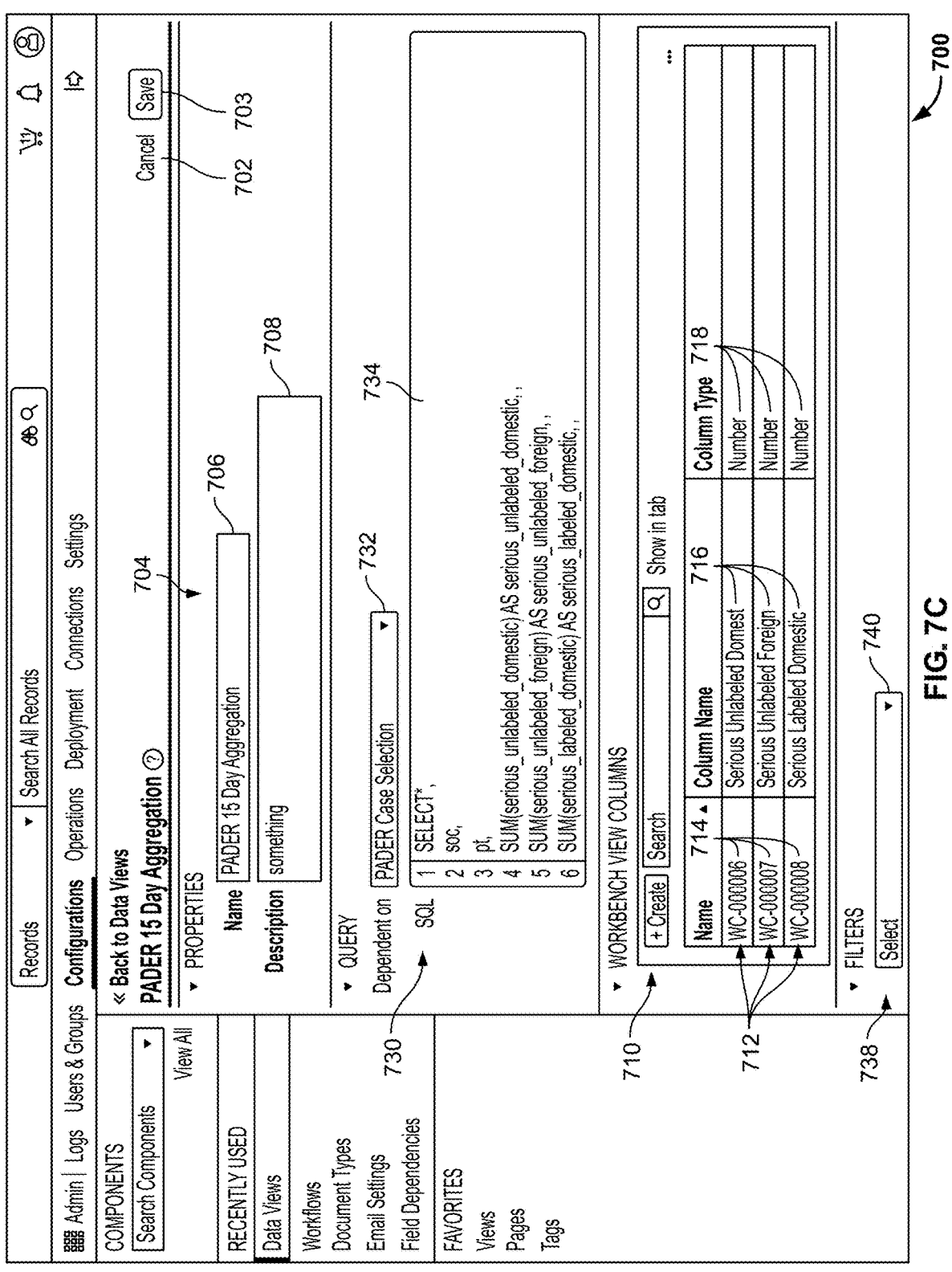

Referring now to FIGS. 7A-7C, a query template page 700 which can be displayed on a display the I/O circuit 180 of the client computing device 112, is shown. In general, the query template page 700 provides the user an interface to setup, modify, and manage a query template for a specific customer. To render or generate the query template page 700 on the client computing device 112, the provider computing system 104 may provide the query template of the query template page 700 and associated data to the client computing device 112. In this regard, it should be understood that each of the sections, fields, or buttons of the query template page 700 may be or included in the query template described herein. As shown, the query template page 700 includes a cancel button 702, a save button 703, a metadata or column view section 710, a query section 730, a filter preferences section 738, and a preview section 724.

The cancel button 702 and the save button 703 may each be a selectable button. Further, when the cancel button 702 is selected, the client computing device 112 may discard any changes made to the query template of the query template page 700. In comparison, in response to a selection of the save button 703, the client computing device 112 may provide the query template (including any changes made to the query template) of the query template page 700 to the provider computing system 104 for storage therein (e.g., as discussed with regard to step 304 of the method 300.

The metadata or column view section 710 may provide the user of the respective client computing device 112 to set and manage the organization of the selected case data, by column, based on the metadata (also referred to as a case data identifier) of the case data (e.g., "case_version," "case_adverse_event," etc.). As shown, the column view section 710 includes a create button 711 and multiple case data identifier or metadata representations 712. The create button 711 is a selectable button that, when selected, causes the client computing device 112 to generate a new column in the selected case data. The new column may be represented by a new column representation 712 in the column view section 710. In some embodiments, in response to selecting the create button 711, a popup page or section (not shown) may be generated and displayed on the query template page 700. The popup page may receive column data (e.g., a column name, a column type, case metadata, etc.) including a column name, a column type, case metadata, and the like. The client computing device 112 may then generate and provide a request to the provider computing system 104 to add the column to the query template including the fields described above.

In some embodiments, in response to selecting the create button 711 and receiving the fields of the column, the client computing device 112 or the provider computing system 104 may generate a new "SELECT" clause and populate the query section 730 of the query template page 700 with the SELECT clause. In other embodiments, the case metadata of the new column may be added into an existing SELECT clause of the query section 730. For instance, in response to generating a new column representation 712 including a metadata reference field 720 of "case_version," the metadata "case_version" may be added to the SELECT clause of the query section 730.

Each column representation 712 may represent a specific piece of case metadata which is to be arranged into a column of the selected case data. For instance, in FIG. 7A, the query template is shown to include three column representations 712. Accordingly, in response to executing the query of the query template of the query template page 700, the provider computing system 104 may organize the selected case data to include three columns (e.g., a first column including case data with the metadata of "case_version," a second column including case data with the metadata of "case_adverse_event," and a third column including case data with the metadata of "case_assessment." As shown, each column representation 712 includes a name field 714, a column name field 716, a column type field 718, and the column reference or metadata reference field 720. In some embodiments, the order in which the column representations 712 are displayed may indicate the order into which selected case data will be arranged. For instance, the first column representation 712 (e.g., the highest) will result in the selected case data being organized such that case data identified in the first column representation 712 will be first. In some embodiments, each column representation 712 may include an order or rank field (not shown) which identifies the order in which the columns of the case data will be arranged. In this regard, the order or rank field may correspond to where the case data identifier will be included in the SELECT clause of the query section 730. For instance, in response to a column representation 712 including a rank or order of "1", the SELECT clause may include the respective case data identifier of the column representation 712 first (e.g., "SELECT controlled_vocabulary.id").

The name field 714 may be a field through which the user of the respective client computing device 112 can review, edit, and/or initially set the name of the column representation 712 which may then be sent by the respective client computing device 112 to the provider computing system 104 for storage. Likewise, the column name field 716 may be a field through which the user of the respective client computing device 112 can review, edit, and/or initially set the name of the column associated with the column representation 712 which may then be sent by the respective client computing device 112 to the provider computing system 104 for storage. In some embodiments, the column name of the column name field 716 may be added to the selected case data.

The column type field 718 may be a field, which is set by the provider computing system 104 based on the metadata reference field 720. For instance, the column type field 718 may include or indicate the data type (e.g., Object, text, number, Boolean (Yes/No), etc.) of the case data set via the metadata reference field 720. In this regard, the metadata reference field 720 may be a field through which the user of the respective client computing device 112 can review, edit, and/or initially set the metadata (e.g., the name of the data object) which identifies the case data to be included in the column of the column representation 712 which may then be sent by the respective client computing device 112 to the provider computing system 104 for storage.

The query section 730 may provide the user of the respective client computing device 112 to set and manage the query (e.g., the SQL) of the query template of the query template page 700. As shown, the query section 730 includes a dependent query drop-down box 732 and a SQL text field 734. The dependent query drop-down box 732 may be a selectable drop-down box that, when selected, drops down multiple query options. Then, in response to the selection of a specific query, the client computing device 112 may indicate the query template 700 of the query template is dependent on (e.g., queries) the selected query of the dependent query drop-down box 732. For instance, FIG. 7C shows the PADER 15 Day Aggregation query template as dependent on the "PADER Case Selection" query template. In this example, the PADER Case Selection query may select case datasets or data records for a PADER. Then, based on the returned data records, the PADER 15 Day Aggregation query may aggregate or sum the number of cases, as shown in FIG. 12.

The SQL text field 734 may be a field through which the user of the respective client computing device 112 can review, edit, and/or initially set the SQL of the query which may then be sent by the respective client computing device 112 to the provider computing system 104 for storage. For instance, the user may enter SQL representing a query (as shown), which may then be executed against the second case repository 146, as described herein. In some embodiments, the client computing device 112 and/or the provider computing system 104 may modify the SQL of the SQL text field 734, in response to changes being made to the column view section 710 and/or the filter section 738. For instance, in response to an additional column representation 712 being added to the column view section 710, the provider computing system 104 may edit or modify the "SELECT" clause of the SQL text field 734 to reflect or include the column view section 710. In one example, a column view section 710 may be added with an order of "1" and a case data identifier of "case_version_v." In response, the provider computing system 104 may modify the "SELECT' clause of the SQL text field 734 to include "SELECT case_version_v". In this regard, the SQL text field 734 may include text data structured according to the SQL syntax, which may include SELECT, WHERE, CASE, FROM, UPDATE, YEAR, and other common SQL syntax clauses.

The filters section 738 may provide the user of the respective client computing device 112 to set and manage filter preferences which are applied to the selected case data after executing the query. As shown, the query section 738 includes a filter drop-down box 740, one or more filter preference representations 742, an advanced logic field 760, and a validate button 762. Each filter preference representation 742 may represent a filter preference and include a metadata or case data identifier field 744, an operator field 746, one or more value fields 748, an available on digital file checkbox 750, an editable checkbox 752, a remove button 754, and an add button 756. The remove button 754 may, when selected, may cause the client computing device 112 to provide an indication or request to the provider computing system 104 to remove the filter preference associated with the filter preference representation 742, which may remove the filter preference from the query template. Likewise, the add button 756, when selected, may cause the client computing device 112 to provide an indication or request to the provider computing system 104 to generate a new filter preference (as represented by a filter preference representation 742), which may generate or add a new filter preference to the query template.

The metadata or case data identifier field 744 may be a field through which the user of the respective client computing device 112 can review, edit, and/or initially set the case data identifier or metadata of the filter preference which may then be sent by the respective client computing device 112 to the provider computing system 104 for storage. For instance, as shown, the metadata or case data identifier field 744 may include metadata describing specific case data (e.g., transmission_state_start_date, transmission_state_end_date, case_adverse_event, etc.). Then, when applying the filters of the filter preference, the provider computing system 104 may search the selected case data for the specific case data identifier and determine if it passes or fulfills the filter preference. For instance, the operator field 746 and the or more value fields 748 may each be a field through which the user of the respective client computing device 112 can review, edit, and/or initially set an operator (e.g., equals, does not equal, >, <, >=, etc.) and a value for comparison, respectfully, of the filter preference, which may be used to determine if the filter preference is met or fulfilled. For instance, the operator field 746 and the or more value fields 748 may be used in combination with the case data identifier field 744 to create a logic statement (e.g., transmission_start_date=Jan. 1, 1990) that evaluates to "TRUE" (e.g., 1) or "FALSE" (e.g., 0). Accordingly, when applying the filters of the filter preference to the selected case data, the provider computing system 104 may search each data record of the selected case data for the specific case data identifier and determine if it passes or fulfills the filter preference by evaluating the logic statement to "TRUE" or "FALSE." For instance, the selected case data may include 40 data records (e.g., 40 rows, each row representing a case data record) and include a column corresponding to the transmission_start_date of the case dataset. Accordingly, for each data record, the provider computing system 104 may determine if the value in the transmission_start_date column is Jan. 1, 1990 (e.g., transmission_start_date==Jan. 1, 1990 evaluates to TRUE). If not, the data record may not fulfill the filter preference and be removed from the selected case data. If so, the data record may fulfill the filter preference and remain in the selected case data.

The available on report 750 checkbox and the editable checkbox 752 may each be selectable checkboxes. When selected, the available on report 750 checkbox may set an available on report preference to "TRUE" or YES for the filter preference of the filter preference representation 742. When, the available on report preference is TRUE, the provider computing system 104 may display the filter preference on the digital file template page 800, as a part of the filters section 812. In comparison, the available on report preference is FALSE, the provider computing system 104 may not display the filter preference on the digital file template page 800. Likewise, the editable checkbox 752 may only be selectable when the available on report checkbox 750 is selected, and may, when selected, cause the provider computing system 104 to set an editable preference to "TRUE" or "YES". When the editable preference is set to "TRUE," the provider computing system 104 may allow the filter preference to be modified or edited via the digital file template page 800 (e.g., in the filter section 812).

The advanced logic field 760 may be a field through which the user of the client computing device 112 can set and modify advanced logical statements (e.g., "filter preference 1&filter preference 2") to be applied when filtering the selected case data. For instance, the advanced logic field 760 may receive logical operators comparing the filter preferences of the filters section 738. In this regard, the advanced logic field 760 may create an additional logic statement that evaluates to true or false for the filter preference(s) of the filters section 738 to be met or fulfilled. Likewise, the validate button 762 may be a selectable button that, when selected, causes the client computing device 112 to provide the filter preferences and the advanced logic of the filter section 738 to the provider computing system 104. The provider computing system 104 may determine if the filter preferences and advanced logic are entered correctly and result in the return of at least one piece of selected case data.

The preview section 724 may provide the user of the respective client computing device 112 with an interface to preview the query of the query template page 700. For instance, the preview section 724 includes a run button 726 that, when selected, causes the client computing device 112 to provide the query template of the query template page 700 to the provider computing system 104 for a preview (e.g., to execute the query to return a select number of data records). For example, in response to a selection of the run button 726, the provider computing system 104 may execute the query on the second case repository 146 to select case data including a specific number of data records (e.g., 50 data records, 10 data records, 100 data records). The selected case data may be provided to the query template page 500 for display in the preview section 724 for evaluation and troubleshooting of the query of the query template.

Referring now to FIGS. 8A-8C, the digital file template page 800 which can be displayed on a display the I/O circuit 180 of the client computing device 112, is shown. In general, the digital file template page 800 provides the user an interface to setup, modify, and manage a digital file template for a specific customer. To render or generate the digital file template page 800 on the client computing device 112, the provider computing system 104 may provide the digital file template of the digital file template page 800 and associated data to the client computing device 112. In this regard, it should be understood that each of the sections, fields, or buttons of the digital file template page 800 may be or included in the digital file template described herein. As shown, the digital file template page 800 includes a cancel button 802, a save button 803, a save and run button 805, a properties or overview section 804, a filters section 812, a digital file layout section 832, an advanced options section 850, and a popup section or page 860.

The cancel button 802 and the save button 803 may each be a selectable button. Further, when the cancel button 802 is selected, the client computing device 112 may discard any changes made to the digital file template of the digital file template page 800. In comparison, in response to a selection of the save button 803, the client computing device 112 may provide the digital file template (including any changes made to the query template) of the digital file template page 800 to the provider computing system 104 for storage therein (e.g., as discussed with regard to step 312 of the method 300. The save and run button 805 may be similar to the save button 803 but further cause the client computing device 112 to generate a request to execute the query and generate the digital file.

The properties or overview section 804 may provide the user of the respective client computing device 112 to set and general properties of the digital file template of the digital file template page 800. As shown, the properties section 804 includes a name field 806, a query template field 808, and a case series or case group field 810. The name field 804 may be a field through which the user of the respective client computing device 112 can review, edit, and/or initially set the name of the digital file template of the digital file template page 800 which may then be sent by the respective client computing device 112 to the provider computing system 104 for storage. Likewise, the query template field 808 may be a field through which the user of the respective client computing device 112 can review, edit, and/or initially set the query template which is used to select the case data for the digital file of the digital file template page 800 which may then be sent by the respective client computing device 112 to the provider computing system 104 for storage.

The case series field 810 may be a field through which the user of the respective client computing device 112 can review, edit, and/or initially set the case series which is used to select the case data for the digital file of the digital file template page 800 may then be sent by the respective client computing device 112 to the provider computing system 104 for storage.

The filters section 812 may provide the user of the respective client computing device 112 an interface to set and manage filter preferences which are applied to the selected case data after executing the query of the query template (e.g., as identified in the query template field 808). As shown, the filters section 812 includes one or more filter preference representations 814, an advanced logic button 830, an advanced logic field (not shown), and a validate button (not shown). Each filter preference representation 814 may represent a filter preference and include a metadata or case data identifier field 816, an operator field 818, one or more value fields 820, a remove button 826, and an add button 828. In some embodiments, the provider computing system 104 may provide the filter preferences of the query template associated or connected with the digital file template for display on the digital file template page 800 as a filter preference representation 814. For instance, in response to the available on report checkbox 750 being checked on the query template page 700, for a specific filter preference representation 742, the filter preference of the filter preference representation 742 may be displayed on the digital file template page 800 as a filter preference representation 814. Likewise, if the editable checkbox 752 is checked, the filter preference representation 814 associated with the filter preference of the filter preference representation 742 may be editable. In comparison, if the editable checkbox 752 is not checked, the filter preference representation 814 associated with the filter preference of the filter preference representation 742 may not be editable and may be read-only and may not include the remove button 826 and/or the add button 828.

The remove button 826 may, when selected, may cause the client computing device 112 to provide an indication or request to the provider computing system 104 to remove the filter preference associated with the filter preference representation 816, which may remove the filter preference from the digital file template of the digital file template page 800. Likewise, the add button 828, when selected, may cause the client computing device 112 to provide an indication or request to the provider computing system 104 to generate a new filter preference (as represented by a filter preference representation 814), which may generate or add a new filter preference to the digital file template.

The metadata or case data identifier field 816 may be a field through which the user of the respective client computing device 112 can review, edit, and/or initially set the case data identifier or metadata of the filter preference which may then be sent by the respective client computing device 112 to the provider computing system 104 for storage. For instance, as shown, the metadata or case data identifier field 816 may include metadata describing specific case data (e.g., transmission_state_start_date, new_info_date, seriousness, product, transmission_state_end_date, case_adverse_event, etc.). Then, when applying the filters of the filter preference, the provider computing system 104 may search the selected case data for the specific case data identifier and determine if it passes or fulfills the filter preference. For instance, the operator field 818 and the or more value fields 820 may each be a field through which the user of the respective client computing device 112 can review, edit, and/or initially set an operator (e.g., equals, does not equal, >, <, >=, etc.) and a value for comparison, respectfully, of the filter preference, which may be used to determine if the filter preference is met or fulfilled. For instance, the operator field 818 and the or more value fields 820 may be used in combination with the case data identifier field 644 to create a logic statement (e.g., transmission_start_date=Jan. 1, 1990) that evaluates to "TRUE" (e.g., 1) or "FALSE" (e.g., 0). Accordingly, when applying the filters of the filter preference to the selected case data, the provider computing system 104 may search each data record of the selected case data for the specific case data identifier and determine if it passes or fulfills the filter preference by evaluating the logic statement to "TRUE" or "FALSE," as described herein.

The advanced logic button 830 is a selectable button that, when selected, causes the client computing device 112 to display the advanced logic field (not shown) and the validate button (not shown), which may be similar to or the same as the advanced logic field 760 and the validate button 762 of the query template page 700. For instance, the advanced logic field may receive logical operators comparing the filter preferences of the filters section 812. In this regard, the advanced logic field may create an additional logic statement that evaluates to true or false for the filter preference(s) of the filters section 812 to be met or fulfilled. Likewise, the validate button may be a selectable button that, when selected, causes the client computing device 112 to provide the filter preferences and the advanced logic of the filter section 812 to the provider computing system 104. The provider computing system 104 may determine if the filter preferences and advanced logic are entered correctly and result in the return of at least one piece of selected case data.

The digital file layout section 832 may provide the user of the respective client computing device 112 an interface to set and manage the digital file layout which is used, by the provider computing system 104, to arrange the selected and filtered case data in the digital file. As shown, the digital file layout section 832 includes an interactive digital file layout 834 and a select fields button 836.

The interactive digital file layout 834 may provide for an interactive region which generally reflects the look of the digital file and includes multiple rows and columns into which the selected and filtered case data is to be arranged. For instance, as shown, the interactive digital file layout 834 includes multiple header representations in a single row, multiple row representations which span the entire columns (e.g., narrative, reporter's comments, company comments, etc.), and multiple section representations 834. In this regard, the user of the client computing device 112 may interact with the interactive digital file layout 834 to select the arrangement (e.g., order, section grouping, headers, columns, etc.) of the case data, when it is added to the digital file. In this regard, the select fields 836, may be a selectable button that, when selected, causes the client computing device 112 to display the popup section 860.

The popup section 860 may be an interface through which the user of the respective client computing device 112 can select the case data fields which are to be included in the digital file layout 834 and the digital file. The popup section 860 may include a search field 862, a fields in the digital file layout listing 864, an all fields listing 870, multiple selection buttons 874, a cancel button 878, and a save button 880. The all fields listing 870 may display or include a listing of each of the fields of the case data returned by the query of the query template and be selectable by a case data identifier 872. Likewise, the fields in the digital file layout listing 864 may display or include a listing of each of the fields of the case data which have been selected and are to be included in the digital file layout 834. The fields may be listed by a case data identifier 866. Then, through interaction with the selection buttons 874, the user of the client computing device 112 may select the fields which are to be included in the digital file layout 834 by adding them to the field in the digital file layout listing 864. To save the selections, the user of the client computing device 112 may select the save button 880. In comparison, to discard the selection, the user of the client computing device 112 may select the cancel button 878.

Still referring to FIGS. 8A-8C, the advanced options section 850 may provide the user of the respective client computing device 112 an interface to select additional options associated with the digital file template 800. As shown, the advanced options section 850 includes a digital file layout template sample button 852, a digital file layout template upload button 854, and a fit PDF to one page checkbox 856. The digital file layout template sample button 852 may be a selectable button that, when selected, causes the provider computing system 104 to output or provide a digital file layout template sample to the respective client computing device 112. Likewise, the digital file layout template upload button 854 may be a selectable button that, when selected, displays an interface to search and select a digital file layout template, which is provided by the client computing device 112 to the provider computing system 104. The fit PDF to one page checkbox 856 is a selectable checkbox that, when selected or checked, causes a fit PDF preference to be set to the "YES" or "ON" for the digital file layout and the digital file, generated as a PDF, to be fit to a single page.

Referring now to FIGS. 9A-9B, a digital file management page 900 which can be displayed on a display the I/O circuit 180 of the client computing device 112, is shown. In general, the digital file management page 900 provides the user an interface to generate and submit a request to execute the query and generate the digital file for a specific customer, as well as download the generated digital file. As shown, the digital file management page 900 includes a run button 902, a properties section 904, a filters section 908, and a download section 912.

The properties section 904 may provide an interface to view the selected properties of the digital file (which were selected via the digital file template page 800) including the name field and the query template field. Likewise, the filters section 908 may provide an interface to view the selected filters of the digital file (which were selected via the query template page 700).

The run button 902 may be a selectable button, that when selected, causes the client computing device 112 to provide a request to the provider computing system 104 to execute the query and generate the digital file, as described with regard to the method 400. For instance, the request may identify the query template and the digital file template, which are to be used to select the case data and generate the digital file. In some embodiments, the request may identify each of the file types of the multiple output buttons 916-922 as the file type of the digital file. In other embodiments, the request may identify a general file type (e.g., CSV) which is then transformed to each of the file types of the multiple output buttons 916-922.

The download section 912 may provide the user of the client computing device 112 an interface to download or receive the digital file and/or the case series in a specific file type. As shown, the digital file section 912 includes multiple output buttons including a digital file Excel output button 916, a digital file PDF output button 918, a digital file CSV output button 920, a case series button 921, and a digital file Vault data storage button 922. Each output button may identify a specific file type and/or destination of the specific data (e.g., the digital file or the case series). For instance, in response to a selection of the digital file excel output button 916, the digital file may be generated or transformed (e.g., from a CSV file) to an Excel file and provided to the respective client computing device 112. In some embodiments, in response to the selection of the run button 902, multiple digital files, of different file types, may be generated (e.g., a digital file corresponding to each output button 916-922).

Likewise, the case series button 921 may be a selectable button to download the case series as a specific file type (e.g., CSV file, Excel file, etc.). For instance, in response to a selection of the case series button 921, the digital file may be generated or transformed and provided to the respective client computing device 112.

The digital file section 912 further includes a date field 924 which identifies the date the digital file was generated; a time field 926 which identifies the time the digital file was generated; a last extract transfer load (ETL) date field 927 which identifies the last time new data was received and the query was ran; and a user field 928 which identifies the user or account which generated the digital file.

Figure 10B:
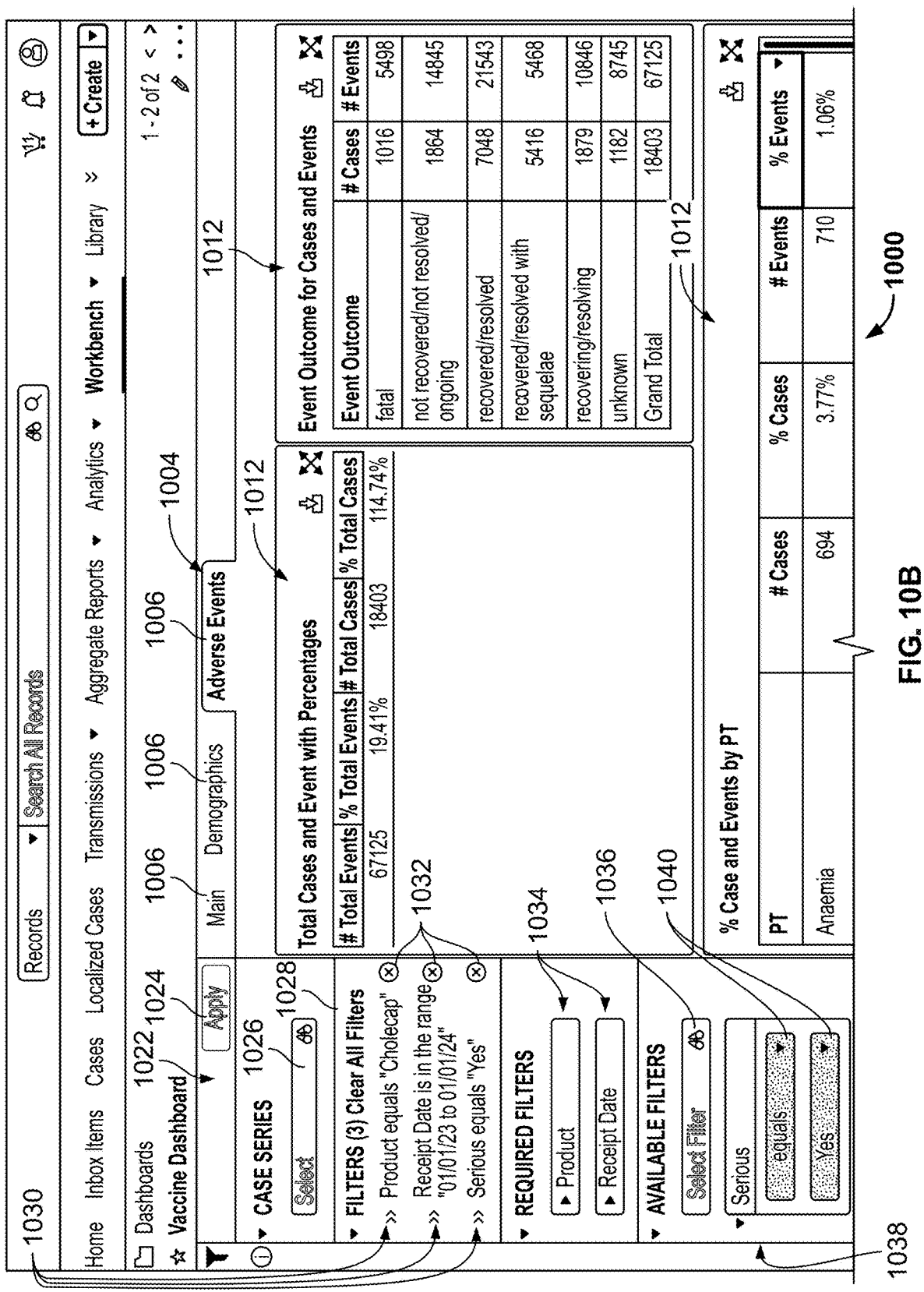

Referring now to FIGS. 10A-10B, the dashboard page 1000 which can be displayed on a display the I/O circuit 180 of the client computing device 112, is shown. In general, the digital dashboard page 1000 provides the user an interface to view and analyze the case data of a query. For instance, the user may be interested in further analyzing or breaking down the case data selected and/or generated in a query and set up a page template defining the dashboard page 1000. Then, the user may navigate to the dashboard page 1000 to view the case data. Accordingly, to display the dashboard page 1000, the provider computing system 104 may provide the case data of a query and/or the page template to the respective client computing device 112 for arrangement and display thereon. As shown, the dashboard page includes a data viewer section 1004 and a filter section 1022.

The data viewer section 1004 displays the case data in a set format and order. Accordingly, the data viewer section includes multiple tabs 1006 and multiple modular components 1012, which are displayed based on the selected tab 1006. The tabs 1006 each define a set of modular components or section 1012 which may be displayed on data viewer section 1004. For instance, in response to a selection of the first tab 1006 (FIG. 10A), the data viewer section 1004 includes four modular components 1012 (e.g., four tables). In comparison, in response to a selection of the third tab (FIG. 10B), the data viewer section 1004 includes three modular components 1012 (e.g., three tables). Each modular component may be a page component which displays a portion of the case data (as defined in the page template) as a specific type (e.g., table, pie chart, histogram, line chart, column chart, etc.).

The filter section 1022 provides the user of the client computing device 112 with an interface to apply one or more filters to the case data and then redisplay the filtered case data on the dashboard page 1000. For instance, the filter section 1022 includes an apply button 1024, a case series field 1026, a clear filters button 1028, multiple applied filter representations 1030, one or more required filter representations 1034, a filter field 1036, and one or more available filter representations 1038. The case series field 1026 may be an editable field to apply a specific case series to the case data of the dashboard page 1000. For instance, in response to a selection of a specific case series in the case series field 1026 (and the apply button 1024), the case data of the dashboard page 1000 may be filtered to only include case datasets that are in or match the corresponding case series.

Similarly, the available filter representations 1038 may each be a representation of a filter to be determined and applied to the case data of the dashboard page 1000 in response to a selection via the filter field 1036. For instance, the user of the client computing device 112 may search and select available filters via the filter field 1036 (e.g., seriousness filter, adverse event filter, medical product filter, etc.). Then, in response to a selection of a specific filter in the filter field 1036 (and the apply button 1024), the case data of the dashboard page 1000 may be filtered to only include case datasets that match or satisfy the filter and a filter representation 1038 may be displayed in the filter section 1022, as described herein. Each filter representation 1038 may include an operator field 1040 and a value field 1040 to set the logic statement of the filter representation 1038.

Likewise, the required filter representations 1034 may each represent a filter that is non-optionable (i.e., always on) for the case data of the dashboard page 1000. For instance, the required filters may be set via the editable checkbox 824. Similarly, the applied filter representations 1030 may each represent an optionable or available filter that has been applied to the dashboard page 1000. In this regard, the user may clear the applied filters of the applied filter representations 1030 by selecting a clear button 1032 for the specific filter representation 1030 or selecting the clear all filter button 1028 to clear all applied filters.

Referring now to FIGS. 11 and 14, two layout files (e.g., the first layout file 1100 and the second layout file 1400) are shown, according to an example embodiment. The layout files 1100 and 1400 may be generated or modified by one of the client computing devices 112 or the partner computing systems 104 and provide a layout template, including formatting, for generating a digital file. In this regard, the layout files 1100 and 1400 may be used in place of the layout section 834 of the digital file template page 800. As shown, the layout files 1100 and 1400 may include column headers and case data identifiers or metadata indicating the data which is to populate each row (e.g., $event-SOC, identifying the event-SOC case data; $event-PT, identifying the event-PT case data, etc.). When generating the digital file, the provider computing system may utilize or copy the layout file 1100 and add the selected case data to the first layout file 1100 or the second layout file 1400. For instance, based on the first layout file 1100, the provider computing system 104 may add the case data identified by the identifier event-SOC to the event-SOC column, the case data identified by the identifier event-PT to the event-PT column, and so on. In some embodiments, the layout files 1100 and 1400 may be received by the provider computing system 104 in response to a selection of the upload button 854.

Referring now to FIGS. 12-13 and 15, three digital files (e.g., a first digital file 1200, a second digital file 1300, and a third digital file 1500) are shown, according to an example embodiment. The digital files 1200, 1300, and 1500 may be generated by the provider computing system 104 based on the digital file template and to include the queried case data. As shown, each of the digital files is structured according to a layout file (e.g., the first layout file 1100 or the second layout file 1400) or the layout section 834 and includes the queried case data populated therein. For instance, the first digital file 1200 includes multiple column headers (e.g., case ID, country gender age, suspect drug, etc.), multiple rows of data (e.g., a single row for case ID, which splits into multiple rows for suspect drug, which splits into multiple rows for adverse reaction, and so on). In another example, the third digital file 1500 includes multiple split rows, based on the second layout file 1400, and a case comments section directly adjacent each case.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that the term "field," as described herein may include any form of an input field through which the user interfaces shown and described may receive input from a user of a computing device. For instance, the term "field" may include a text field, a drop-down box and selectable options, a list box, a lookup box, a search bar, an icon, one or more checkboxes, one or more radio buttons, a button, a toggle, a date field, a slider, and the like. Further, each "field" may include and/or receive data that may be associated with a data object as described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for generating and populating a digital file in a case processing and analysis system, wherein the case processing and analysis system comprises a provider computing system including a column-oriented repository for storing modified case data, a first repository for storing query templates, a second repository for storing digital file templates, and a third repository for storing a plurality of case data records including case data, the method comprising:

receiving, by a network interface of the provider computing system, a first request to add the case data of the plurality of case data records of the third repository to the column-oriented repository;

modifying, by a processing circuit of the provider computing system, the case data to restructure the case data from a first data structure to a column-oriented data structure, wherein the case data is restructured such that each case data record of the plurality of case data records is maintained in the modified case data;

storing, by the processing circuit, the modified case data in the column-oriented repository;

receiving, by the network interface, a second request identifying a query template and a digital file template;

selecting, by the processing circuit, the query template including a query from the first repository;

executing, by the processing circuit, the query of the query template on the column-oriented repository to select a portion of the modified case data stored in the column-oriented repository;

selecting, by processing circuit, the digital file template including at least one filter and a digital file layout from the second repository;

filtering, by the processing circuit, the selected portion of the modified case data based on the at least one filter of the digital file template to generate filtered case data;

generating, by the processing circuit, the digital file based on the digital file layout of the digital file template and the filtered case data; and outputting, by the network interface, the digital file.

2. The method of claim 1, wherein the portion of the modified case data is a first portion of the modified case data, wherein the filtered case data is first filtered case data, and wherein the method further comprises:

executing, by the processing circuit, the query of the query template on the column-oriented repository to generate a second portion of case data based on the first portion of the modified case data; and filtering, by the processing circuit, the second portion of case data based on the at least one filter of the digital file template to generate second filtered case data, and wherein the digital file is generated based on the digital file layout of the digital file template, the first filtered case data, and the second filtered case data.

3. The method of claim 2, wherein the modified case data is structured into a plurality of columns, wherein each column of the plurality of columns includes a plurality of values, wherein the query of the query template includes a sum clause, and wherein the second portion of case data is generated by summing each value of the plurality of values of a column of the plurality of columns.

4. The method of claim 1, further comprising:

receiving, by the network interface, the digital file template; and storing, by the processing circuit, the digital file template in the second repository.

5. The method of claim 4, further comprising:

outputting, by the network interface circuit, the digital file template to a client computing device to enable display on a user interface, wherein the user interface includes a digital file template page comprising:

a filter preference section; and a layout file upload button, wherein the at least one filter of the digital file template is received via the filter preference section; and wherein the digital file layout of the digital file template is received as a layout file in response to a selection of the layout file upload button.

6. The method of claim 4, further comprising:

outputting, by the network interface, the digital file template to a client computing device to enable display on a user interface, wherein the user interface includes a digital file template page comprising:

a filter preference section; and a digital file layout section, wherein the at least one filter of the digital file template is received via the filter preference section, and wherein the digital file layout of the digital file template is received via the digital file layout section.

7. The method of claim 1, further comprising:

receiving, by the network interface, the query template; and storing, by the processing circuit, the query template in the first repository.

8. The method of claim 7, further comprising:

outputting, by the processing circuit, the query template to a client computing device to enable display on a user interface, wherein the user interface includes a query template page comprising:

a query section, wherein the query of the query template is received via the query section in a Structured Query Language (SQL).

9. The method of claim 1, wherein the query template includes metadata of the modified case data, and wherein the method further comprises:

organizing, by the processing circuit, the selected portion of the modified case data based on the metadata of the query template.

10. The method of claim 1, wherein the second request further identifies a page template, and wherein the method further comprises:

selecting, by processing circuit, the page template including a first modular component associated with a second filter and a second modular component associated with a third filter;

filtering, by the processing circuit, the selected portion of the modified case data based on the second filter of the first modular component to generate second filtered case data;

filtering, by the processing circuit, the selected portion of the modified case data based on the third filter of the second modular component to generate third filtered case data; and outputting, by the network interface, the second filtered case data and the third filtered case data to a client computing device to enable display on a user interface based on the page template, wherein the user interface includes the page comprising the first modular component and the second modular component.

11. A method for generating and displaying a page of a graphical user interface in a case processing and analysis system, wherein the case processing and analysis system comprises a provider computing system including a column-oriented repository for storing modified case data, a first repository for storing query templates, a second repository for storing page templates, and a third repository for storing a plurality of case data records including case data, the method comprising:

receiving, by a network interface of the provider computing system, a first request to add the case data of the plurality of case data records of the third repository to the column-oriented repository;

modifying, by a processing circuit of the provider computing system, the case data to restructure the case data from a first data structure to a column-oriented data structure, wherein the case data is restructured such that each case data record of the plurality of case data records is maintained in the modified case data;

storing, by the processing circuit, the modified case data in the column-oriented repository;

receiving, by the network interface, a second request identifying a query template and a page template;

selecting, by the processing circuit, the query template including a query from the first repository;

executing, by the processing circuit, the query of the query template on the column-oriented repository to select a portion of the modified case data stored in the column-oriented repository;

selecting, by processing circuit, the page template including a first modular component associated with a first filter and a second modular component associated with a second filter;

filtering, by the processing circuit, the selected portion of the modified case data based on the first filter of the first modular component to generate first filtered case data;

filtering, by the processing circuit, the selected portion of the modified case data based on the second filter of the second modular component to generate second filtered case data; and outputting, by the network interface, the first filtered case data and the second filtered case data to a client computing device to enable display on a user interface based on the page template, wherein the user interface includes the page comprising a data viewer section including at least one of: the first modular component or the second modular component.

12. The method of claim 11, wherein the portion of the modified case data is a first portion, and wherein the method further comprises:

executing, by the processing circuit, the query of the query template on the column-oriented repository to generate a second portion of case data based on the first portion of the modified case data; and filtering, by the processing circuit, the second portion of case data based on the first filter of the first modular component to generate third filtered case data; and filtering, by the processing circuit, the second portion of case data based on the second filter of the second modular component to generate fourth filtered case data, and wherein the network interface outputs the first filtered case data, the second filtered case data, the third filtered case data, and the fourth filtered case data.

13. The method of claim 12, wherein the modified case data is structured into a plurality of columns, wherein each column of the plurality of columns includes a plurality of values, wherein the query of the query template includes a sum clause, and wherein the second portion of case data is generated by summing each value of the plurality of values of a column of the plurality of columns.

14. The method of claim 11, wherein the page template includes a first tab comprising the first modular component, and wherein the page template includes a second tab comprising the second modular component, wherein the page of the graphical user interface includes a first selectable option associated with the first tab and a second selectable option associated with the second tab, and wherein:

in response to a selection of the first selectable option, the data viewer section includes the first modular component of the first tab; and in response to a selection of the second selectable option, the data viewer section includes the second modular component of the second tab.

15. The method of claim 11, wherein the first modular component includes a table type, and wherein the second modular component includes a line chart type, wherein the first modular component is displayed as a table on the data viewer section, and wherein the second modular component is displayed as a line chart on the data viewer section.

16. The method of claim 11, wherein the page template includes an arrangement of the first modular component and the second modular component, and wherein the first modular component and the second modular component are arranged on the data viewer section based on the arrangement of the page template.

17. The method of claim 11, further comprising:

receiving, by the network interface, the query template; and storing, by the processing circuit, the query template in the first repository.

18. The method of claim 17, further comprising:

outputting, by the processing circuit, the query template to a client computing device to enable display on a user interface, wherein the user interface includes a query template page comprising:

a query section, wherein the query of the query template is received via the query section in a Structured Query Language (SQL).

19. The method of claim 11, wherein the query template includes metadata of the modified case data, and wherein the method further comprises:

organizing, by the processing circuit, the selected portion of the modified case data based on the metadata of the query template.

20. The method of claim 11, wherein the second request further identifies a digital file template, and wherein the method further comprises:

selecting, by processing circuit, the digital file template including at least one third filter and a digital file layout from the second repository;

filtering, by the processing circuit, the selected portion of the modified case data based on the at least one third filter of the digital file template;

generating, by the processing circuit, the digital file based on the digital file layout of the digital file template and the filtered portion of the modified case data; and outputting, by the network interface, the digital file.

\* \* \* \* \*